United States Patent [19]

Ide

[11] Patent Number: 5,125,754
[45] Date of Patent: Jun. 30, 1992

[54] MULTI-DEFLECTION PAD HYDRODYNAMIC THRUST AND JOURNAL BEARINGS HAVING A MODULAR CONSTRUCTION

[76] Inventor: Russell D. Ide, 641 Arnold Rd., Coventry, R.I. 02816

[21] Appl. No.: 541,131

[22] Filed: Jun. 4, 1990

Related U.S. Application Data

[63] Continuation-in-part of Ser. No. 516,781, Apr. 30, 1990, and a continuation-in-part of Ser. No. 516,977, Apr. 30, 1990, each is a continuation-in-part of Ser. No. ˜09,081, filed as PCT/US/88/01841, Oct 25, 1988, which is a continuation-in-part of Ser. No. 283,529, Oct. 25, 1986, which is a continuation-in-part of Ser. No. 55,340, May 29, 1989, abandoned.

[51] Int. Cl.⁵ .............................................. F16C 17/06
[52] U.S. Cl. ................................................... 384/122
[58] Field of Search ............... 384/122, 124, 117, 119, 384/308, 312

[56] References Cited

U.S. PATENT DOCUMENTS 2,424,028 7/1947 Haeberlein .
4,496,251 1/1985 Ide ..................................... 384/117
4,676,668 6/1987 Ide .

Primary Examiner—Lenard A. Footland
Attorney, Agent, or Firm—Marks & Murase

[57] ABSTRACT

A hydrodynamic bearing which includes a carrier and a plurality of bearing pads circumferentially spaced about the carrier. The pads may have a modular construction whereby pad portions are releasable secured to support portions. The pads may also be releasably secured to the carrier. Various bearing pad construction, are contemplated including constructions in which the secondary support includes a membrane and the primary support portion includes a cylindrical member extending between the membrane and the bearing pads. A continuous bearing pad ring may be substituted for the discrete bearing pads. The carrier may be provided with locator pins in the pad receiving bores to orient the pads properly. The carrier may have cuts and grooves formed therein to provide a flexible or even beam mounted support for the bearing pads. The bearing may also have a multimode configuration and may include smart structures.

21 Claims, 32 Drawing Sheets

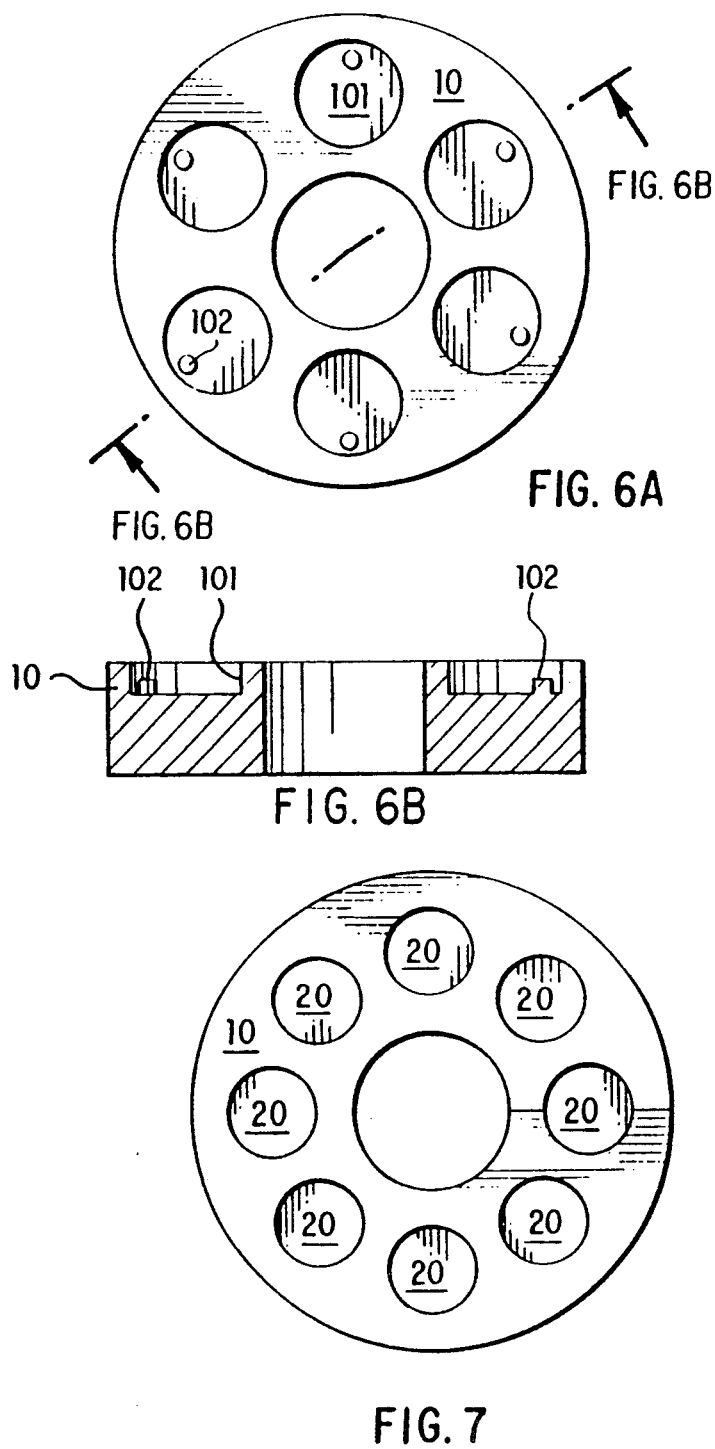

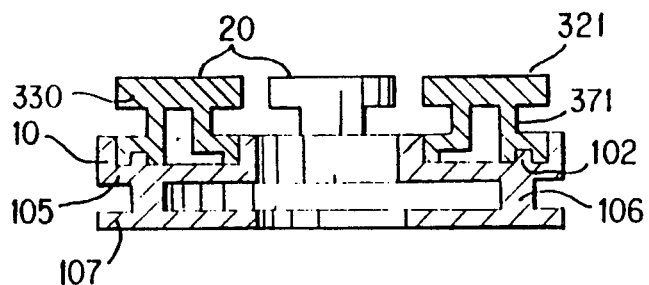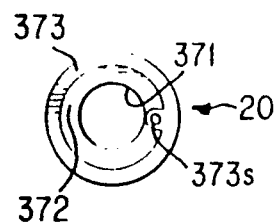
FIG. 13A    FIG. 13B
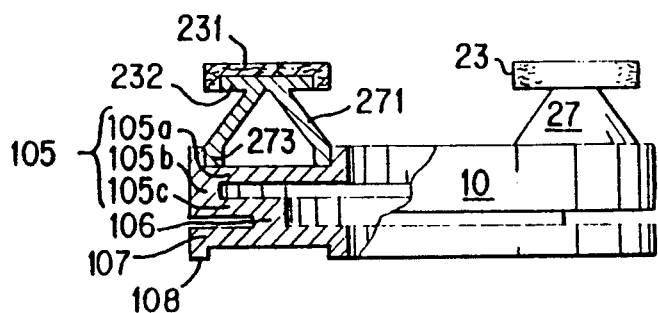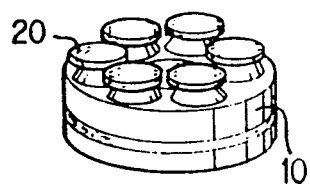
FIG. 14A    FIG. 14B
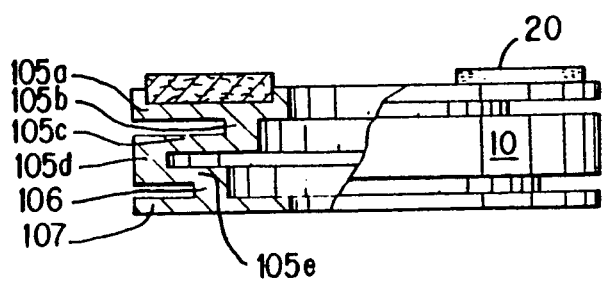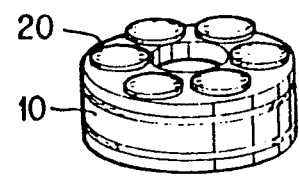
FIG. 15A    FIG. 15B

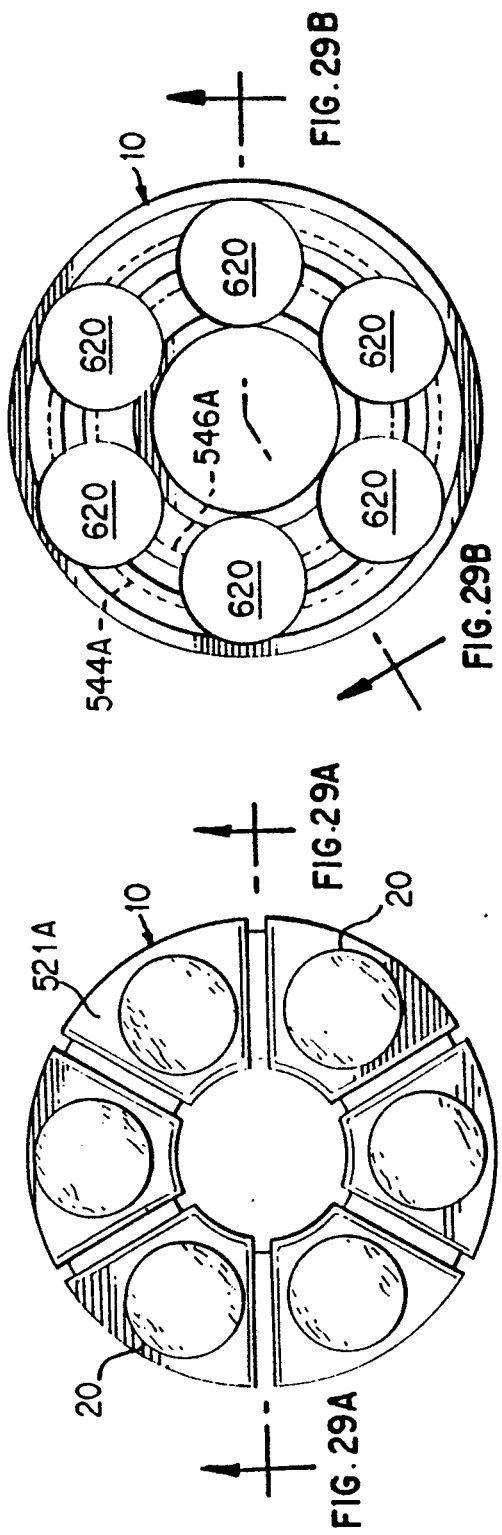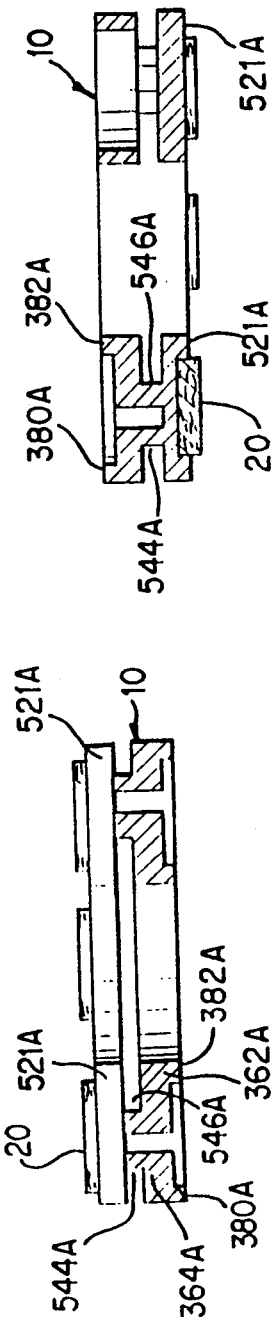

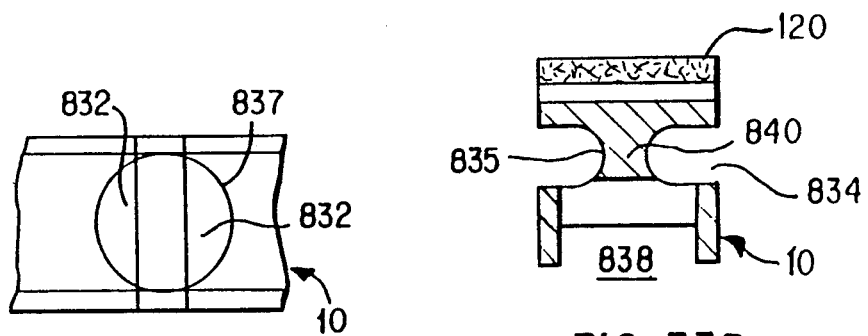
FIG. 33A
FIG. 33B
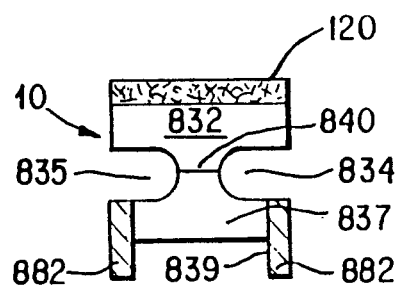
FIG. 33C
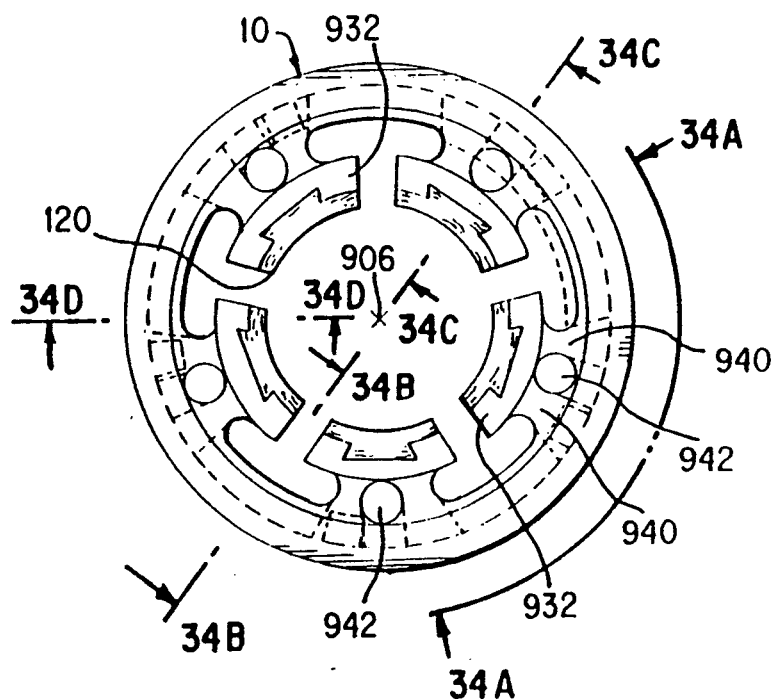
FIG. 34

MULTI-DEFLECTION PAD HYDRODYNAMIC THRUST AND JOURNAL BEARINGS HAVING A MODULAR CONSTRUCTION

BACKGROUND OF THE INVENTION

This application is a continuation-in-part of, and claims the benefit of 35 U.S.C. § 120 with respect to the applicant's copending U.S. applications Ser. Nos. 07/516,781 and 07/516,977 both filed Apr. 30, 1990 and both of which are continuation-in-part applications of the applicant's copending U.S. application Ser. No. 07/309,081, filed Feb. 2, 1989, which claimed the benefit of international application PCT/US88/01841, filed Oct. 25, 1988 and corresponding U.S. application Ser. No. 07/283,529, of which it is a continuation-in-part, filed Oct. 25, 1988 which in turn was a continuation-in-part of and claimed the benefit of applicant's U.S. patent application Ser. No. 07/055,340, filed May 29, 1987 and now abandoned.

The present invention relates to hydrodynamic bearings. In such bearings, a rotating object such as a shaft is supported by a stationary bearing pad via a pressurized fluid such as oil, air or water. Hydrodynamic bearings take advantage of the fact that when the rotating object moves, it does not slide along the top of the fluid. Instead the fluid in contact with the rotating object adheres tightly to the rotating object, and motion is accompanied by slip or shear between the fluid particles through the entire height of the fluid film. Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is deflected at a small angle to the rotating member, the fluid will be drawn into the wedge-shaped opening, and sufficient pressure will be generated in the fluid film to support the load. This fact is utilized in thrust bearings for hydraulic turbines and propeller shafts of ships as well as in the conventional hydrodynamic journal bearing.

Both thrust bearings and radial or journal bearings normally are characterized by shaft supporting pads spaced about an axis. The axis about which the pads are spaced generally corresponds to the longitudinal axis of the shaft to be supported for both thrust and journal bearings. This axis may be termed the major axis.

In an ideal hydrodynamic bearing, the hydrodynamic wedge extends across the entire bearing pad face, the fluid film is just thick enough to support the load, the major axis of the bearing and the axis of the shaft are aligned, leakage of fluid from the ends of the bearing pad surface which are adjacent the leading and trailing edges is minimized, the fluid film is developed as soon as the shaft begins to rotate, and, in the case of thrust bearings, the bearing pads are equally loaded. While an ideal hydrodynamic bearing has yet to be achieved, a bearing which substantially achieves each of these objectives is said to be designed so as to optimize hydrodynamic wedge formation. The "optimum wedge" for any particular application depends on, among other things, the amount of load to be carried. If a heavy load is to be carried, a relatively thick fluid film is needed. Otherwise, a thin film is used to reduce friction and the power losses associated with friction.

The present invention relates generally to hydrodynamic bearings that are also sometimes known as movable pad bearings and methods of making the same. Generally, the pads of these bearings are mounted in such a way that they can move to permit the formation of a wedge-shaped film of lubricant between the relatively moving parts. Since excess fluid causes undesirable friction and power losses, the fluid thickness is preferably just enough to support the maximum load. This is true when the formation of the wedge is optimized. Essentially the pad displaces with a pivoting or a swing-type motion about a center located in front of the pad surface, and bearing friction tends to open the wedge. When the formation of the wedge is optimized, the wedge extends across the entire pad face. Moreover, the wedge is formed at the lowest speed possible, ideally as soon as the shaft begins to rotate.

U.S Pat. No. 3,107,955 to Trumpler discloses one example of a bearing having beam mounted bearing pads that displace with a pivoting or swing-type motion about a center located in front of the pad surface. This bearing, like many prior art bearings, is based only on a two dimensional model of pad deflection. Consequently, optimum wedge formation is not achieved.

In U.S. Pat. No. 2,137,487 to Hall, there is shown a hydrodynamic movable pad bearing that develops its hydrodynamic wedge by sliding of its pad along spherical surfaces. In many cases the pad sticks and the corresponding wedge cannot be developed. In U.S. Pat. No. 3,930,691 to Greene, the rocking is provided by elastomers that are subject to contamination and deterioration.

U S Pat. No. 4,099,799 to Etsion discloses a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

U.S. Pat. No. 4,496,251 to Ide, the present inventor, discloses a pad which deflects with web-like ligaments so that a wedge shaped film of lubricant is formed between the relatively moving parts.

U.S. Pat. No. 4,515,486, also to Ide, discloses hydrodynamic thrust and journal bearings comprising a number of bearing pads, each having a face member and a support member that are separated and bonded together by an elastomeric material.

U.S. Pat. No. 4,526,482 to Ide discloses hydrodynamic bearings which are primarily intended for process lubricated applications, i.e., the bearing is designed to work in the available fluid rather than a special lubricating fluid. The hydrodynamic bearings are formed with a central section of the load carrying surface that is more compliant than the remainder of the bearings such that they will deflect under load to form a pressure pocket of fluid or to change eccentricities.

This application is particularly related to hydrodynamic thrust and journal bearings. When the hydrodynamic wedge in such bearings is optimized, the load on each of the circumferentially spaced bearings is substantially equal for thrust bearings.

Presently, the most widely used hydrodynamic thrust bearing is the so-called Kingsbury shoe-type bearing. The shoe-type Kingsbury bearing is characterized by a complex structure which includes pivoted shoes, a thrust collar which rotates with the shaft and applies load to the shoes, a base ring for supporting the shoes, a housing or mounting which contains and supports the internal bearing elements, a lubricating system and a cooling system. As a result of this complex structure, Kingsbury shoe-type bearings are typically extraordinarily expensive.

An alternative to the complex Kingsbury shoe-type bearing is a unitary pedestal bearing which has been employed in, among other things, deep well pumps. This relatively simple structure is typically formed by sand casting or some other crude manufacturing technique. The bearing is structurally characterized by a flat base having a thick inner circumferential projection, a plurality of rigid pedestals extending transversely from the base and a thrust pad centered on each rigid pedestal.

The present inventor has also discovered that the center pivot nature of both the known rigid pedestal bearing shown and the Kingsbury shoe-type bearing contribute to bearing inefficiency. It should also be noted that, because of their rigid center pivots, neither the Kingsbury shoe-type bearings nor the pedestal bearing shown can deflect with six degrees of freedom to optimize wedge formation. Thus, while, in some instances, the prior art bearings are capable of movement with six degrees of freedom, because the bearings are not modeled based upon or designed for six degrees of freedom, the resulting performance capabilities of these bearings are limited.

To a large extent, the problems associated with prior art hydrodynamic bearings have been solved by the bearing construction described in U.S. Pat. No. 4,676,668 to Ide, the present inventor. This bearing construction includes a plurality of discrete bearing pads press fit into a support portion. The bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments. These teachings are applicable to both journal and thrust bearings.

While the construction described in the present inventor's previous patent represents a significant advance in the art, commercial production has shown that improvements are possible. For instance, the shape of the bearing pads is relatively complex; and consequently somewhat difficult to mass produce, use in radial or journal bearings, and dampen.

Additionally, since the bearing pads are unitary, the entire bearing pad must sometimes be constructed out of the most expensive material necessary in any part of the bearing. The unitary construction also makes it difficult to change the performance characteristics of any particular bearing pad. This necessitates a different bearing pad for each application thus limiting the ability to standardize bearing components (i.e., use standard components in different configurations for each application) and achieve the cost and other commercial advantages associated with standardization.

The press fitting of the pads into the carrier also complicates assembly of bearings. Moreover, by virtue of this press fit, the bearing pads cannot be easily removed from the carrier. This complicates reuse of the carrier (the most substantial portion of the bearing) in the event of a failure.

Also, the bearing performs optimally in only one mode of operation and its deflection characteristics are not actively controllable.

SUMMARY OF THE INVENTION

The present invention relates to improvements in hydrodynamic thrust and journal bearings of the type which includes a plurality of discrete bearing pads mounted in a carrier in a circumferentially spaced relation. Generally, the present invention relates to improvements in pad and carrier design.

Conceptually, the bearing pads and carriers of the present invention are designed by treating the pads and carriers as a solid piece of material and then selectively removing or adding material to the solid to cause it to deflect in a desired way under design loads. It can be readily appreciated that myriad designs are possible. Thus, it should be kept in mind that the structural features disclosed herein are generally applicable to any other bearing pad if structural conditions make this possible.

Among other things, the present invention provides hydrodynamic thrust and journal bearings adapted to support a rotating shaft which bearings include: a carrier member having a plurality of bores or other openings formed therein, the bores being symmetrically arranged about a predetermined axis and a plurality of bearing pads secured in the bores of the carrier, each of the bearing pads having a pad portion having a pad surface and a support portion. The support portion may include a primary support structure, a secondary support structure and tertiary support structure. In accordance with one aspect of the present invention, the pad portion may be releasably secured to the primary support structure of the support portion and the tertiary support structure of the support portion may be releasably secured in one of the plurality of bores or openings. Also, the carrier may be configured to provide a spring or other flexible support for discrete pads mounted thereon which pads may or may not have separate support portions. For instance, the carrier may be formed with cuts and/or grooves to provide a thin beam or membrane support for each pad. The beam or membrane could be fluid dampened if desired. The support portion of each of the bearing pads is adapted to deflect under load so as to cause the pad surface of the pad portion to form a hydrodynamic wedge with respect to the rotating shaft. The support portion may have various forms including a hollow frustum, a plurality of legs formed out of a frustum, legs formed out of a cylindrical portion and legs formed out of a hollow cylindrical portion.

The construction of the present invention obviates the disadvantages associated with previous discrete pad bearing constructions by providing a bearing which may include modular bearing pads having threads or similar type connectors for releasably securing the bearing pads to a support structure provided with a complementary connecting means. At its other end, the support structure can include threads or similar connectors for releasably securing the support structure to a complementary connector provided in the carrier to assist in assembly and disassembly of the bearing. The pad surface bearing pad portion may also be coated with a separate material such as hardened rubber or the surface may have a separate pad insert of a high performance material such as silicon carbide. As a result of the modular construction of the individual bearing pads, increased standardization can be achieved; standard parts can be used to vary the performance characteristics of any particular bearing pad by, for example, using different combinations of standard bearing pad support portions and bearing pad portions. Almost any shape bearing pad can be used, and it is possible to use a continuous bearing pad ring rather than discrete bearing pads. Also, the standard parts can have shapes which are much easier to manufacture. The use of standardized parts also makes it easier to vary performance to meet customer demands. Further, the modular construction reduces the cost of the bearing pads since expensive high performance materials need only be used where necessary rather than throughout the pad.

In accordance with other aspects of the present invention, the support portion of the bearing pad may include a modified support structure in which the primary support portion is mounted on a continuous membrane which can be non-symmetrically perforated to provide preloading or biasing in a predetermined direction. The primary support portion itself may be simplified to comprise a single relatively rigid beam or a tube-like member which is undercut and/or overcut so that, under loading, it pivots in a predetermined direction. Additionally, the perforations or openings .formed in the membrane to bias the bearing pad in a predetermined direction can also function as locator openings for receiving a locating pin mounted in the carrier so as to precisely position the bearing pad with respect to the carrier. This improved bearing pad is easier to manufacture in large quantities than the relatively complex stool type bearing pad described in my previous patent.

In accordance with another embodiment, the primary support portion of the support structure can be frustoconical. Such a construction is easier to manufacture and more durable than pads with a ligament type construction. The frustum type primary support portion makes the pad more rigid. Thus, this construction is well suited to heavy load applications.

The present invention also relates to discrete pad bearings using solid non-deflecting pads such as coin-like pads. Such pads may be formed of a smart material to allow it to change shape or size to adjust wedge formation. The non-deflecting pads are mounted on carriers which include beam mounted pad support surfaces such that while the pad itself does not deflect, the surface on which it is supported deflects to adjust the attitude of the pad surface for proper wedge formation.

The present invention also relates to the use of such flexible carriers to support any of the bearing pads of the present invention.

The present invention also relates to a dovetail modular bearing construction in which the carrier is formed with dovetail grooves and the bearing pads have complimentary dovetail portions such that the bearing pads can be releasably locked into the carrier. The bearing pads include a pad portion and a support portion having a dovetail portion. The pad support portion and/or the carrier provides flexible support for the bearing pad portion. Generally, the dovetail construction is most suitable for radial or journal bearings.

The present invention also relates to a multimode bearing which operates optimally under two or more distinct sets of operating conditions, i.e., modes of operation. This is done by providing two or more types of bearing pads in the carrier. For example one set of pads could be designed for low speed high load support and the other set of pads could be designed for high speed low load support. The pads of each type are evenly distributed around the circumference of the carrier (circumferentially spaced). In one construction, the pads designed for low load support are slightly closer to the shaft portion to be supported so that, under low loads, only these pads operate to support the shaft. Under higher loads these pads are deflected away from the shaft and another group of pads supporting the shaft. One way of achieving such an effect is by mounting the low load pads on a flexible beam or membrane support portion of the carrier which deflects under the higher loads. Alternatively, the pad support structure itself can be designed to deflect as desired. In this way the bearing can support a shaft optimally under two, three or more sets of operating conditions.

The present invention also relates to bearing constructions which are actively or dynamically controllable.

The invention also relates to the use of so called "intelligent" or "smart" materials in bearings for actively or dynamically controlling wedge formation. A smart bearing structure combines three types of components each having a specific function. The first component is a structural component which is the core of the bearing pad. The structural component is formed of a structural material such as steel, bronze, aluminum, ceramics, plastics or light weight composites. This component forms the framework or skeleton of the bearing support. The second component is the sensor component. This component is formed of a material tailor-made to sense and monitor changes and conditions such as temperature, pressure etc. which are indicative of hydrodynamic wedge quality. Materials capable of performing these functions include piezoelectric materials such as quartz, and certain polymers and TERFENOL. The third component of the so-called smart bearing is an actuator component. The actuator component expands or contracts or changes its rigidity to optimize a wedge formation. Materials capable of doing this include piezoelectric materials, electrorheological (ER) fluids which change the viscosity in the presence of electric fluids (such that they can rapidly change from free flowing liquids into pseudo-solids depending on the strength of the electric field thereby offering a selective rigidity) and magnetostrictive rare earth alloys such as TERFENOL that produce large dimensional changes when exposed to a magnetic field.

As noted above, smart materials which can be used include piezoelectric materials, electrorheological (ER) fluids. Another such material is electroceramic materials which are capable of sensing environmental changes (such as pressure chemical changes) and move or undergo some other physical change in response to the sensed changes. For instance, lead zirconium-titante-based devices have been developed which are compliant like rubber in response to pressure. In this way, an intrinsically hard ceramic device can be made to absorb rather than reflect vibration.

Another useful material are the so called shape-memory metals i.e., alloys that change from one shape to a former shape when heated past a point called a transition temperature. Such shape-memory metals can be used in composite materials such that as the temperature changes and the imprisoned alloys try to resume their earlier shape, the surrounding composite resists the internal movements. In turn, this resistance changes mechanical properties of the composite such as its stiffness and the frequencies at which it can vibrate. The most well known shape-memory metal is a nickel-titanium alloy known as nitinol.

The structural component of the dynamic or actively controlled bearings of the present invention is similar to the other bearings and bearing pads disclosed herein. However, the sensor and actuator components are provided so as to allow active control of the deflection characteristics and/or shape of the bearing pads, support structure and/or carrier structure. In one example, the sensor and actuator component are used in a feedback system wherein the physical conditions sensed by the sensor are used to control the actuator. For example, the sensor and actuator components can both be constructed of smart materials such as a piezoelectric material. The first piezoelectric material senses pressure and produces a signal which is fed into a feedback amplifier. The feedback amplifier processes the pulse or signal and sends a voltage to the actuator causing it to expand or contract. As the actuator expands or contracts it alters the sensed condition until an equilibrium condition is achieved.

The bearings of the present invention can be formed of any suitable material. The primary consideration is that the support structure must deflect rather than deform to enable proper wedge formation. Thus, while deformation is acceptable and sometimes desirable, deflection is primarily relied upon for proper wedge formation.

BRIEF DESCRIPTION OF THE DRAWINGS

FIG. 6A is a top view of a carrier member having a locator posts for positioning the bearing pads.

FIG. 6B is a cross-section of the carrier member of FIG. 6B along the lines indicated in FIG. 6A.

FIG. 7 is a top view showing an arrangement of bearing pads on a carrier according to the present invention.

FIG. 13A is a side cross-section of a bearing which includes a beam-mounted carrier and a plurality of bearing pads.

FIG. 13B is a bottom view of one of the bearing pads of the bearing of FIG. 13A.

FIG. 14A is a side view with a cutaway portion of a bearing which includes a beam mounted carrier and a plurality of frusto-conical bearing pads.

FIG. 14B is a perspective view of the bearing of FIG. 14A.

FIG. 15A is a side view partially cut away of a bearing which includes a beam mounted carrier supporting a plurality of bearing pads.

FIG. 15B is a perspective view of the bearing of FIG. 15A.

FIG. 29A is a cross-section of another thrust bearing construction having a beam mounted carrier according to the present invention.

FIG. 29B is a cross-section of the bearing of FIG. 29A.

FIG. 30A is a top view of the bearing of FIG. 29A.

FIG. 30B is a bottom view of the bearing of FIG. 29A.

FIG. 33A is a detail view of a portion of the outer periphery of the bearing of FIG. 33.

FIG. 33B is a cross-section of the bearing of FIG. 33.

FIG. 33C is another cross section of the bearing of FIG. 33.

FIG. 34 is a side view of another dovetail journal bearing according to the present invention.

DETAILED DESCRIPTION OF THE DRAWINGS

FIGS. 1A–1D illustrate the general environment of the present invention, namely hydrodynamic bearings, thrust or journal, which include a carrier member 10 having a plurality of openings such as bores formed therein and a plurality of bearing pad members 20 mounted in the openings. The bearing pads may be circumferentially spaced as indicated in, for example FIGS. 1B, 1C, 7–9, 16, 17B and 18B.

Throughout the following discussion, it should be kept in mind that any of the bearing pads disclosed herein are usable, or easily adaptable for use, in either thrust or journal bearings in the manner disclosed generally in FIGS. 1A–1D. Thus, although in some instances, specific examples show bearing pads used in a thrust bearing construction, the bearing pads are also usable in a radial bearing construction. Thus, radial bearings can be provided with flexible carrier structures in much the same manner as thrust bearings.

Figure 1A:
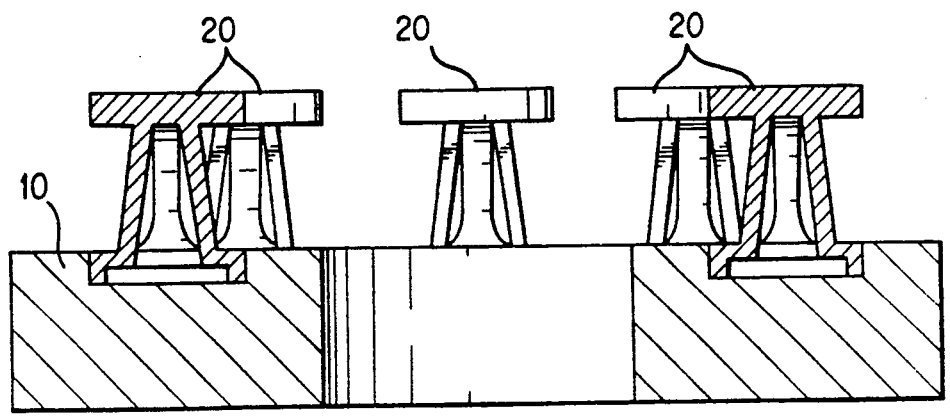
FIG. 1A is a side cross-section of a thrust bearing construction according to the present invention.
Figure 1B:
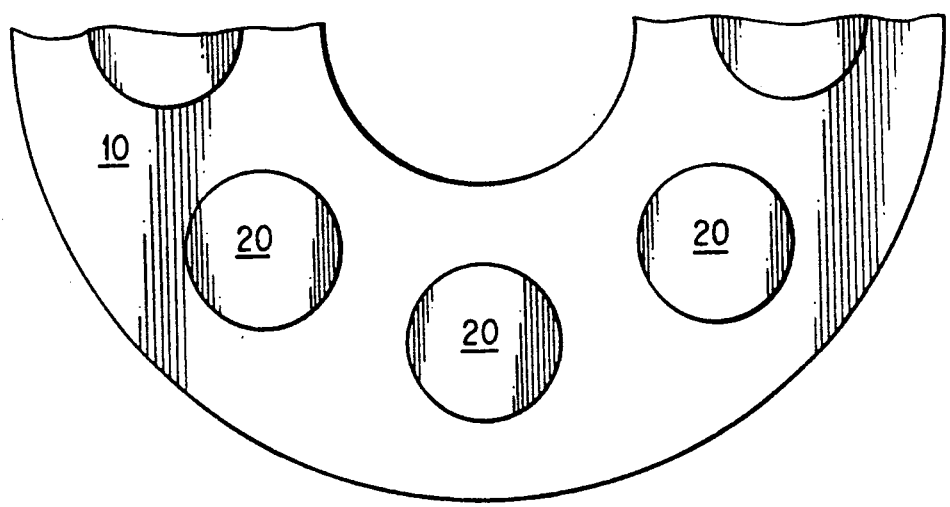
FIG. 1B is a partial top view of the bearing construction of FIG. 1A.
Figure 1C:
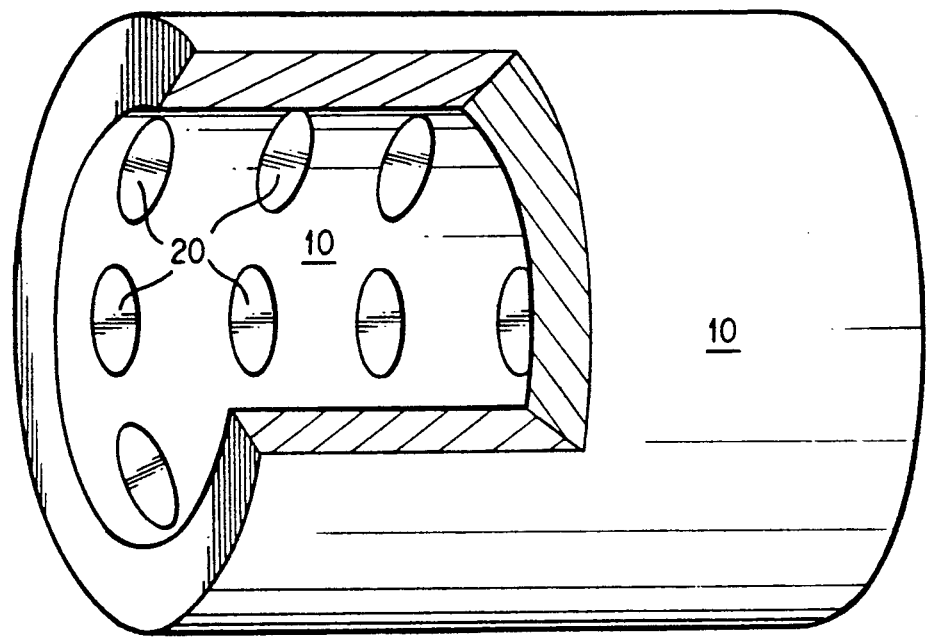
FIG. 1C is a perspective view, partially cut away, of a journal bearing construction according to the present invention.
Figure 1D:
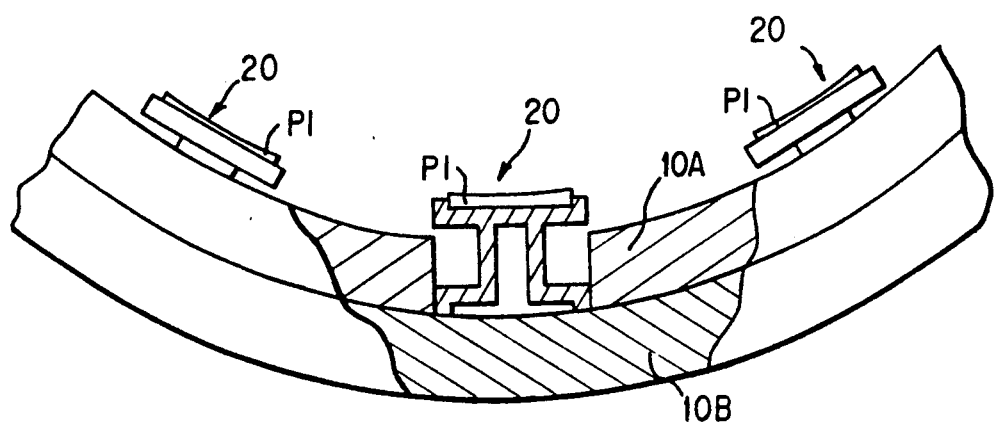
FIG. 1D is a partial end view of a bearing of the type shown in FIG. 1C with a cross-sectional cut away.

The formation of circumferentially spaced bores in an annular disk-like carrier such as that shown in FIGS. 1A and 1B is, naturally, a simple matter. On the other hand, the formation of radially oriented cylindrical bores in a journal bearing of the type shown in FIGS. 1C and 1D is somewhat more problematic. The simplest way of providing such bores is to form the bores radially through the entire carrier 10. In some cases this may not be desirable. In such cases, a two part carrier such as that shown in FIG. 1D can be used. As shown in FIG. 1D, the carrier is formed from two cylindrical members—an inner cylindrical member 10A and an outer cylindrical member 10B. The inner cylindrical member 10A is formed with a plurality of radially directed bores in which bearing pads 20 can be mounted. The outer cylindrical member 10B is continuous so as to back up or support the bearing pads and to provide a continuous outer surface. The two cylindrical members 10A, 10B are secured to one another so as to operate as a unit. It should be noted that FIG. 1D depicts a new hollow tubular bearing pad 20 with a separate pad insert PI. These are discussed in greater detail below.

Figure 2:
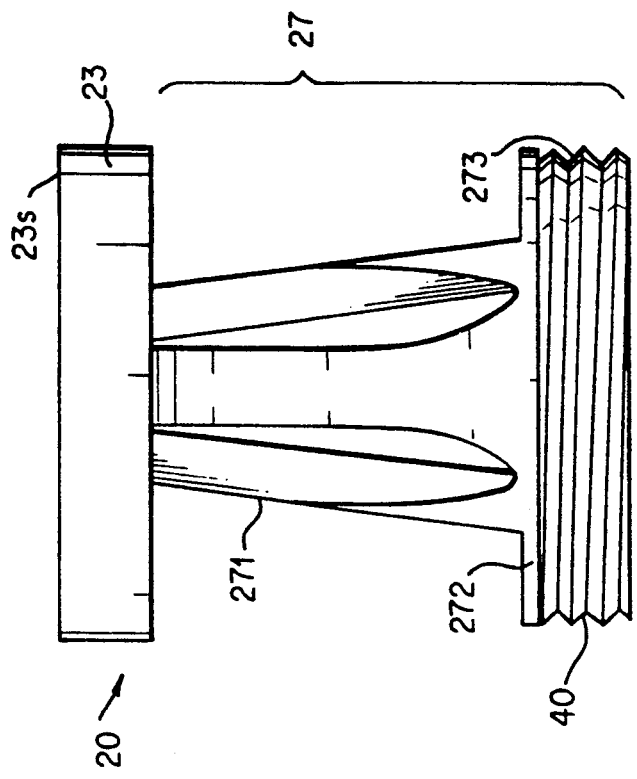
FIG. 2 is a side view of a first modular bearing pad according to the present invention.

FIG. 2 illustrates a modified bearing pad construction in accordance with one aspect of the present invention. The bearing pad generally includes a pad portion 23 and a support portion 27. The pad portion 23 includes a pad surface 23s. The support portion 27 of the bearing pad 20 includes at least a primary support portion 271, a secondary support portion 272 and a tertiary support portion 273. The primary support portion includes a plurality of angled legs 271 converging toward a point above the pad surface and having a complex shape formed from a hollow frusto-conical or frustum section, an outwardly extending secondary support portion 272 and a dog legged tertiary support portion 273. This bearing pad is generally similar to the bearing pad disclosed in U.S. Pat. No. 4,676,668. However, the pad 20 in FIG. 2 is formed with a thread 40 at its lower end. As detailed below, the provision of such a thread allows the pad to be releasably secured within the carrier which is advantageous in some cases.

FIGS. 3A-3F illustrate other forms of frustoconical or frustum shaped bearing pad constructions.

Figure 3A:
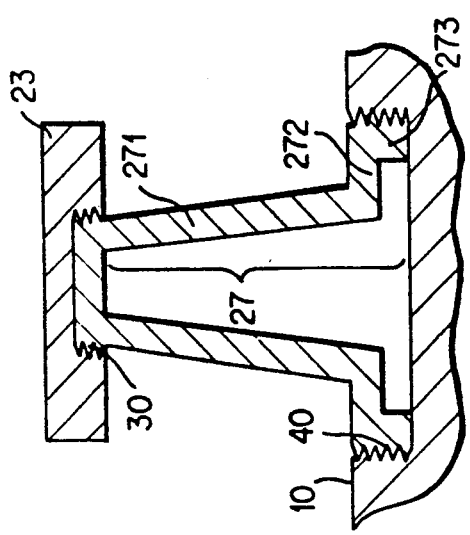
FIG. 3A is a cross-section of a modular bearing pad assembled in a carrier.

FIG. 3A shows, in cross-section, a bearing pad of the type shown in FIG. 2 mounted in a carrier 10. The bearing pad includes a pad portion 23 and a support portion 27 supporting the pad portion for deflection under load. In the illustrated example, the support portion includes a primary support portion 271 comprising a plurality of angled beams or ligaments formed from a frustoconical body. The legs or beams are angled toward a point located above the pad surface. The support portion 27 further comprises an annular membrane 272 secondary support portion, and a dog leg 273 tertiary support portion. The bearing pad 20 is releasably secured in the carrier 10 by threads 40 formed at the lower end of the bearing pad. In a similar manner, the bearing pad portion 23 of the bearing pad is releasably secured to the support structure 27, by threads 30 formed at the upper portion of the support structure 27.

Figure 3B:
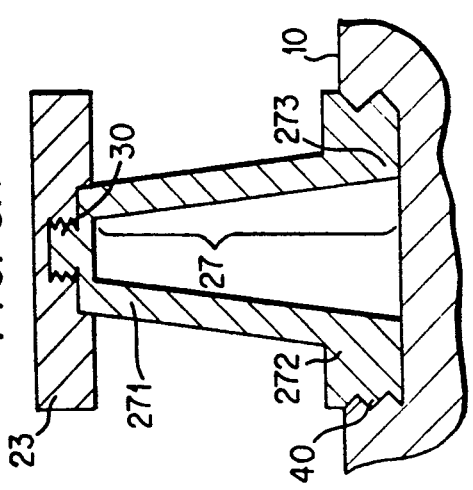
FIG. 3B is a cross-section of another modular bearing pad according to the present invention.

The bearing pad of FIG. 3B is similar to that of FIG. 3A with several exceptions. First, a connecting post 30 having threads is used to provide the releasable connection between the bearing pad portion 23 and the support structure 27. Second, the secondary and tertiary support portions 272 and 273 have no flexibility relative to one another, i.e., they are formed as part of the unitary dog leg.

Figure 3C:
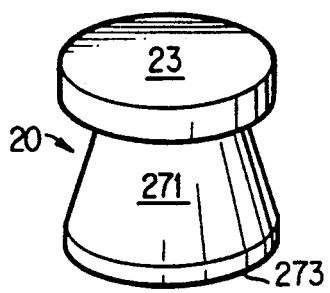
FIG. 3C is a perspective view of a frusto-conical or frustum shaped bearing pad according to the present invention.
Figure 3D:
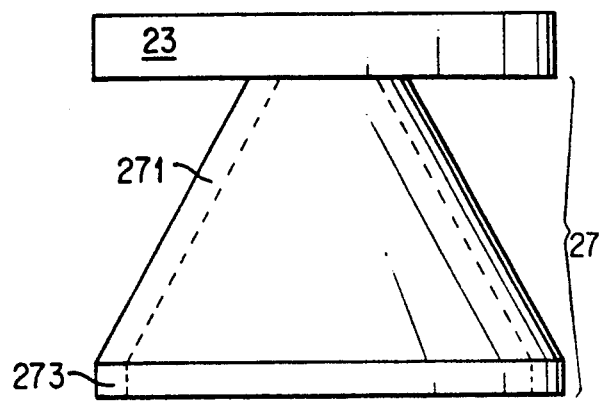
FIG. 3D is a side view of the frusto-conical bearing pad of FIG. 3C with the hidden cross-sectional lines indicated in phantom.

FIGS. 3C and 3D illustrate another form of frustoconical pad 20. This pad differs from the pads of FIGS. 2, 3A and 3B in that primary support portion 271 is a continuous hollow frustoconically shaped member 271 rather than a plurality of beams or ligaments formed from such a member. The continuous frustoconical shape which forms the primary support portion 271 tapers toward a point located the above surface of the pad portion 23. Also, the frustoconical primary support portion 271 is supported on a single dog leg portion 273.

The continuous construction of the primary support portion 271 as well as the rigid dog leg portion 273 make this bearing pad significantly more rigid than the bearing pads of FIGS. 2, 3A and 3B. Such a rigid pad would generally be used in high load applications. Although not specifically shown, it should be appreciated that the bearing pad portion 23 could be formed either integrally or separately from the support portion 27. Also, the dog leg or tertiary support portion 273 could have a connecting means, such as a screw thread, formed thereon.

Figure 3F:
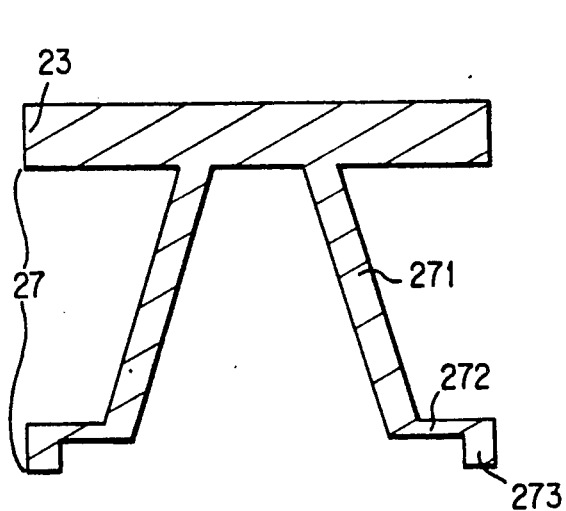
FIG. 3F is a cross-section of the frusto-conical bearing pad of FIG. 3E.
Figure 3E:
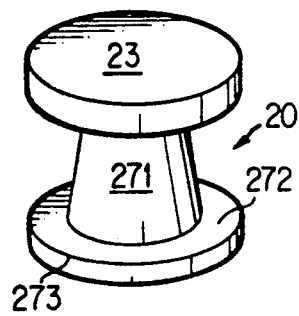
FIG. 3E is a perspective view of another frusto-conical bearing pad according to the present invention.

FIGS. 3E and 3F show another frustoconically shaped bearing pad according to the present invention. This bearing pad is similar to that of FIGS. 3C and 3D except that it includes a secondary support portion 272 in the form of a continuous membrane. As detailed below, the membrane can be divided into a plurality of beams by providing openings in it. The provision of the membrane or other secondary support portion 272 gives the support structure 27 enhanced flexibility (particularly in the vertical direction) such that the bearing pad of FIGS. 3E and 3F is more flexible than that of FIGS. 3C and 3D.

It should be noted that any of the bearing pad configurations disclosed herein can, if desired, be used as part of a modular system. This is done by, for example, forming the pad portion and the support structure as separate connectable pieces and/or providing a means for releasably securing the support structure to the carrier.

As noted above, one aspect of the present invention resides in the modular construction of bearings. Specifically, for any of the bearing pads described herein the pad portion 23 may be formed separately from the support portion 27 and provided with a connector which cooperates with a complementary connector in the support portion to releasably or non-releasably secure the pad portion to the support portion during manufacture to form a bearing pad. In the embodiment illustrated in FIG. 3A, the connector is in the form of a thread 30 formed on the upper end of the pad support portion. A complimentary threaded bore or screw receiving portion is formed in the pad portion 23. Thus, the pad portion 23 can be releasably screwed onto the support portion 27 to form a complete bearing pad. Naturally, any known complementary connectors can be employed to connect the pad portion to the support portion. In fact, some dovetail bearing pads such as those shown, for example, FIGS. 20A-E and FIGS. 31 and 32 could only use non-rotating connectors such as snap on connectors; screw type connectors would be unacceptable. Moreover, the pad may be either releasably secured, i.e., secured in a manner which enables repeated release and re-securing in a normal manner, or non-releasably secured to the pad portion. For instance, the pad portion may be press fit onto the support portion; the pad portion may be cam-locked onto the support portion (non-releasable); the pad portion may be keyed onto the support portion (releasable); the pad portion may be snap fit onto the pad portion (generally non-releasable). When a polymeric or rubber pad portion is desired, it may be molded or otherwise formed directly on the support structure. Examples of connectors are shown in FIGS. 12A-12F and discussed below.

Forming the pad portion and the support portion separately offers considerable advantages over previously known unitary constructions. For example, different pad portions may be associated with any particular support portion so that standard pad portions and standard support portions may be combined to provide a wide variety of bearing pads suitable for use in numerous applications. Thus, through the provision of a predetermined number X of standard bearing pad portions and a predetermined number Y of standard support portions, X times Y variations of bearing pads can be constructed. Accordingly, virtually any desired performance characteristic can be obtained. The versatility of the modular system can be further increased through the use of spring-like beam mounted carriers as discussed below.

The standard pad portions and support portions can be varied according to shape, material and size to yield desired performance characteristics. For example, the pads can be formed of polymeric materials, metal, ceramic or composites. As discussed in detail below any or all of the pads, support structure and carrier may have a "smart" structure such that the pad adjusts itself in response to actual conditions and these components may also have dynamic actively controllable structures. The shape of the pads will normally be dictated by manufacturing and performance considerations. Typically, the shapes shown in FIGS. 7-10 would be used. However, manufacture of any desired shape is made easier when the pads are formed separately. For example, the pads can be stamped or molded even when the entire bearing can not be molded.

Naturally, the size of the pad affects its flexibility and consequently its performance. Generally, it is preferable to have a nearly continuous bearing surface. Hence, it is usually desirable to size the pads such that when the bearing is assembled, the pads are nearly in contact.

In accordance with another aspect of the present invention, the pad support structure 27 can also include a connector 40 at its lower end to allow the bearing pad 20 to be releasably secured to the carrier 10 via a complementary connector formed in the carrier. In the embodiment illustrated in FIG. 3A, a thread is formed on the outer periphery of the tertiary support portion 273 and complimentary thread receiving bores are formed in the carrier. By virtue of this construction, the bearing pads can be easily threaded into the carrier 10 to facilitate assembly. Moreover, should a failure of the bearing pads occur, the carrier 10, which is significantly more massive and expensive in terms of material cost than the bearing pads, can be salvaged. The bearing pads have heretofore been press fit into the carrier.

Figure 12A:
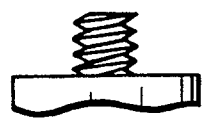
FIG. 12A is a detail, side view of a screw type modular connector.
Figure 12B:
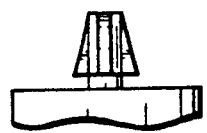
FIG. 12B is a detail side view of a locking spline type modular connector.
Figure 12C:
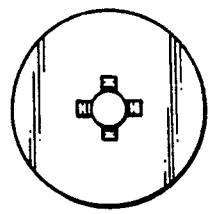
FIG. 12C is a top view of the locking spline type modular connector of FIG. 12B.

Naturally, any known form of complementary connectors can be used to secure the bearing pads 20 to the carrier 10. Examples of alternative connectors are shown in FIGS. 12(A)–12(C) and the dovetail construction of FIG. 20A et. seq. and are discussed below. However, as noted above, complementary connectors which are selectively releasable, such as the illustrated threads, offer advantages by, among other things, enabling standardization.

Figure 4A:
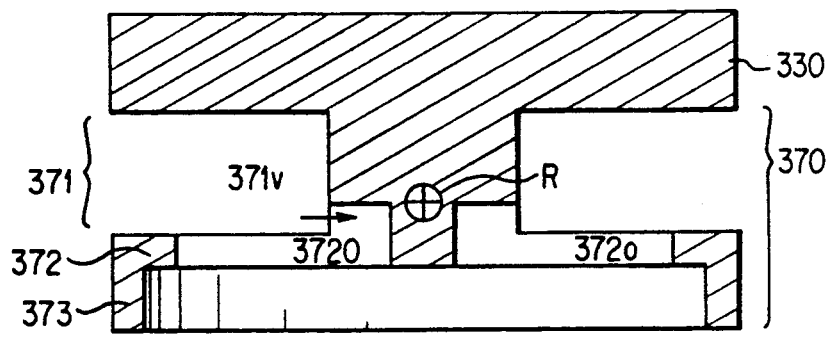
FIG. 4A is a cross-section of a cylindrical bearing pad according to the present invention.
Figure 4B:
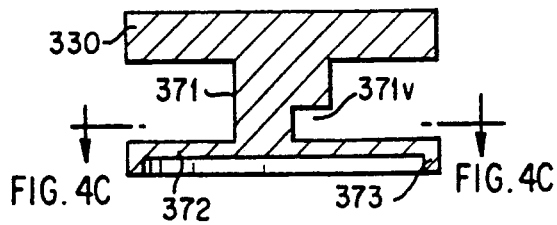
FIG. 4B is a cross-section of another cylindrical bearing pad according to the present invention.
Figure 4C:
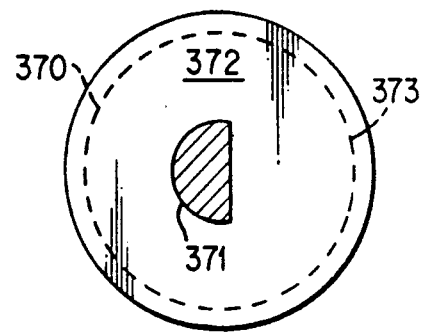
FIG. 4C is a cross-section of the bearing pad of FIG. 4B along the lines indicated in FIG. 4B with hidden lines indicated in phantom.

FIGS. 4A–4E illustrate bearing pad constructions in which the primary support portion 371 is essentially a substantially rigid single cylindrical or pedestal type member. To simplify their depiction, the bearing pads are shown as unitary members. Naturally, the pads can have separate pad portions and support portions and include threads or other means to facilitate their attachment to the carrier. In the example shown in FIG. 4A, the secondary support portion 372 is a membrane divided by openings 372o into beams and the tertiary support portion 373 is a continuous annular flange. The bearing pad also includes a bearing pad portion 330 which may be formed integrally (as shown) or separately in the modular style described above. This construction is simpler than the aforementioned construction because of the relative simplicity of the primary support portion. The primary support member 371 functions as a pivot type support. To enhance the pivot effect the pedestal and membrane are undercut by extending (such as by milling) holes 3720 through the membrane and partially through the pedestal. Alternatively, or in addition, the pedestal can be undercut by forming a groove into the pedestal as shown in FIG. 4C. As noted above, the provision of holes through the membrane 372 divides the membrane into beam portions. The non-symmetrical nature of the undercut 371v causes the pedestal 371 (and hence the pad portion 330) to rock about an axis R which is transverse to the bearing pads major axis M; the major axis is defined as the longitudinal axis of the bearing pad which, in the case of a bearing pad mounted in a bore in a carrier, typically corresponds to an axis which is transverse to the plane of the bearing pad surface (unloaded) which axis passes through the center of the bore and the geometric center of the bearing pad surface. The division of the continuous membrane 372 makes it possible to bias the bearing pad in a predetermined direction. Specifically, the bearing pad can be biased in a predetermined direction by providing non-symmetrical openings 372o in the membrane or secondary support portion 372. Whenever, by the provision of non-symmetrical openings or other structural features, a bearing support structure is made to be more flexible in one direction than in the other direction it is based in the direction of greater flexibility. By virtue of the illustrated construction, the bearing pad 20 tends to deflect more easily about the axis R than about any other axis which is transverse to R. Both the undercut and the non-symmetrical openings thus bias the bearing pad in a predetermined direction. To ensure proper positioning of biased pads in the carrier locating means of the type discussed below can be used.

FIGS. 4B and 4C show a cross-sectional side view of a bearing pad having a construction similar to that of the bearing pad of FIG. 4A except that the secondary support portion 372 is a continuous membrane and the undercut 371v is provided by forming a groove in the pedestal 371. As noted previously, because of the undercut 371v, the bearing tends to rock about a predetermined axis R. The resulting non-symmetrical loading of the membrane causes the pad portion 330 to deflect downward under loading in the direction indicated by the arrow D.

Naturally, many modifications of this pad support construction are possible. For example, the membrane support portion 372 can be provided with openings to provide additional flexibility in the membrane; such openings may be provided non-symmetrically to bias the bearing pad. Also, the continuous peripheral tertiary support portion 373 can be divided into a number of circumferential beam portions to provide additional flexibility to the support structure, bias the support structure in a predetermined direction and/or make it possible to position the pad precisely, as discussed below.

Figure 4D:
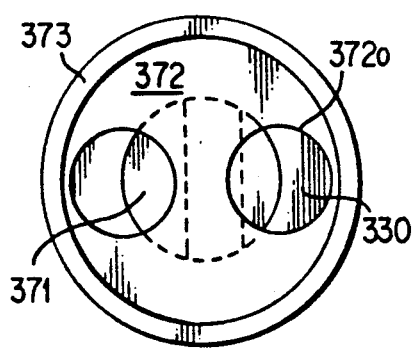
FIG. 4D is a bottom view of another bearing pad according to the present invention with hidden lines indicated in FIG. 4E is a cross-section of the cylindrical bearing pad of FIG. 4D.
Figure 4E:
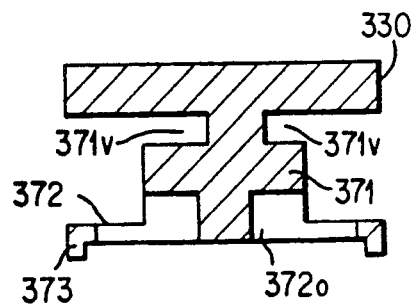

FIGS. 4D and 4E illustrate another possible cylindrical pad support structure. This construction combines the structural features of the bearing pad shown in FIG. 4A and the bearing pad shown in FIG. 4D and 4E. Specifically, the primary support portion 371 is vertically cut by two grooves or slots 371v and is undercut by openings 372o extending through the secondary support part 372. As is evident from both FIG. 4D and FIG. 4E one of the slots 371v cuts deeper into the pedestal 371 than the other slot. This non-symmetrical slot arrangement causes the pad to be biased (i.e., have a tendency to deflect) toward the side with the deeper slot. As a result of this construction, the primary support portion is biased so as to deflect or rock about two axes. Since the cut 371v and the openings are parallel, these axes are also parallel. Naturally, the orientation or dimensions of any of the cuts or openings provided in the support structure could be varied in order to alter the deflection characteristics of the pad support portion 37.

FIG. 4D is a bottom view of the bearing pad support construction of FIG. 4E. A bottom view of the support construction of FIG. 4A would be quite similar but would not include the phantom lines indicating the slots 371v. As shown in FIG. 4D, the openings 372o in the membrane 372 are symmetrically disposed so that the membrane is equally pre-biased. Of course, the membrane can be provided with additional openings to non-symmetrically bias the support structure in the manner described below with reference to FIG. 5B.

It should be appreciated that the cylindrical bearing pad constructions shown in FIGS. 4A–4E are illustrative of the structural features which can be designed into a cylindrical bearing pad to achieve desired results. There are, of course, numerous variations and possible combinations of these structural features. For instance, in a construction such as that shown in FIG. 4E which includes a plurality of slots cut into the pedestal-like primary support portion 371, the slots can be skewed with respect to one another or non-coplaner to alter deflection characteristics. Likewise, the openings 372 formed in the membrane can be extended into the primary support portion as shown in FIGS. 4A and 4E to any desired height or can be formed solely in the secondary support portion 372 to alter the deflection characteristics. Additionally, the openings may be formed nonsymmetrically and any number of openings can be provided. Finally, as mentioned above, the tertiary support portion 373 can be divided into beam-like segments or otherwise modified to alter its deflection characteristics.

Conceptually, the design of any of the bearing pads of the present invention is based upon the addition and/or removal of material from selected portions of the support structure to alter the deflection characteristics of the bearing pad. In this way, the bearing pads may be viewed as a piece of putty from which material is taken or added to in selected areas to increase or decrease the rigidity of the support structure to achieve desired deflection under design conditions. As discussed in detail below, the carrier may also be designed in this way.

Figure 5A:
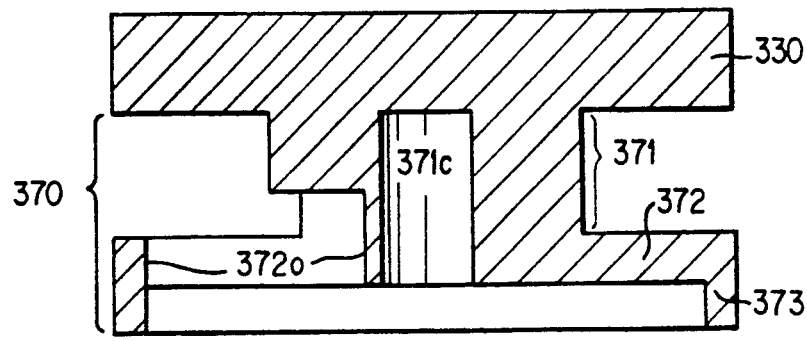
FIG. 5A is a cross-section of a hollow tubular bearing pad according to the present invention.
Figure 5B:
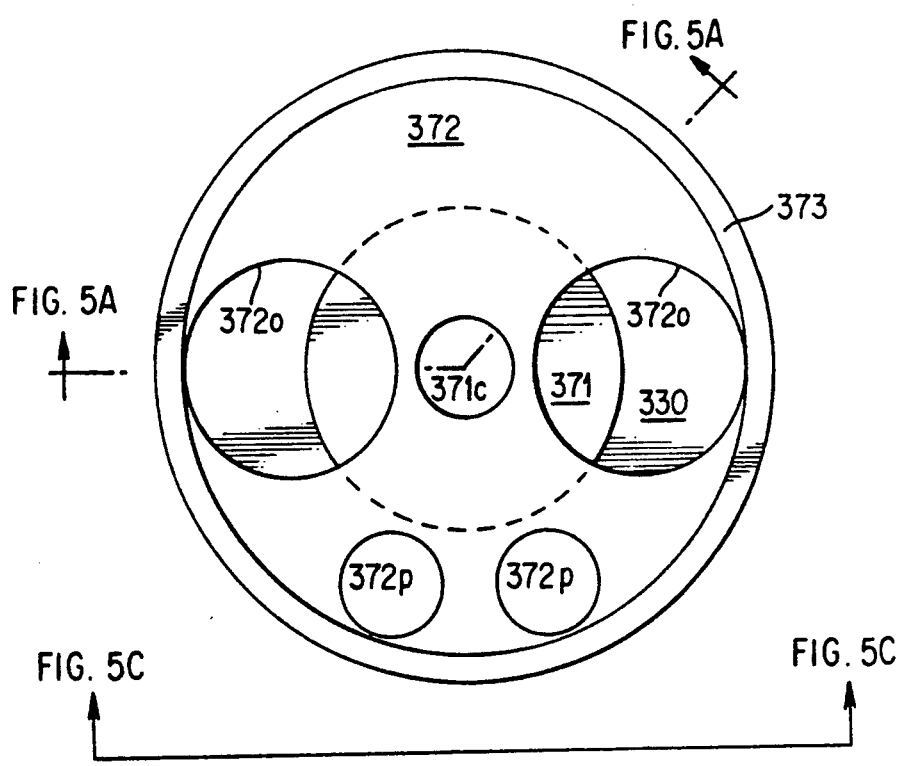
FIG. 5B is a bottom view of the bearing pad of FIG. 5A with hidden lines indicated in phantom.
Figure 5C:
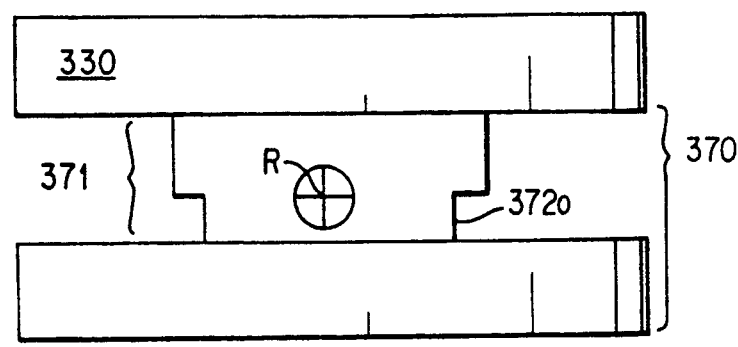
FIG. 5C is a side view of the bearing pad of FIGS. 5A and 5B along the lines indicated in FIG. 5B.

FIGS. 5A–5E illustrate a bearing pad construction having a tubular support structure. A first such construction is illustrated in FIGS. 5A–5C. This construction is generally similar to that shown in FIG. 4A in that the bearing pad includes a pad portion 330, the secondary support portion 372 comprises a membrane-like member (which may or may not be provided with openings) and the tertiary support portion 373 comprises a continuous annular flange. The pad support structure of FIGS. 5A–5C differs from that of FIG. 4A in that the primary support portion 371 has a central bore 371c formed therein such that the primary support portion is formed as a cylindrical tube-like hollow pedestal. In the embodiment illustrated in FIG. 5A, the annular wall of the hollow pedestal is relatively thick and quite rigid. In order to provide flexibility to this primary support portion, openings, undercuts or overcuts are formed in the annular wall. In the illustrated embodiment, this is achieved by extending the openings 372o formed in the membrane 372 through a portion of the wall so as to undercut a portion of the wall as best shown in FIG. 5A. Because of this undercut, the primary support portion tends to deflect in the direction of the undercut. Of course, the primary support portion 371 could be biased in other ways such as, for example, by undercutting the wall in a manner similar to that illustrated in FIG. 4E.

FIG. 5C shows a side view of the bearing of FIG. 5A. The view is along the line of the axis R about which the primary support portion tends to deflect.

As best shown in FIG. 5B, the membrane of the second support portion 372 is provided with additional openings 372p which are non-symmetrically disposed with respect to the major axis of the bearing pad. Because of the non-symmetrical disposition of these openings, e membrane, and hence the second support portion 372, is more flexible in this direction. Accordingly, the entire support structure is pre-biased in the direction of greater flexibility of the membrane, i.e., the direction in which the additional openings 372p are disposed. The provision of additional openings such as those shown at 372p may have the additional function of receiving locating pins formed in the carrier member so as to precisely position a prebiased pad within the carrier member as discussed below.

Figure 5D:
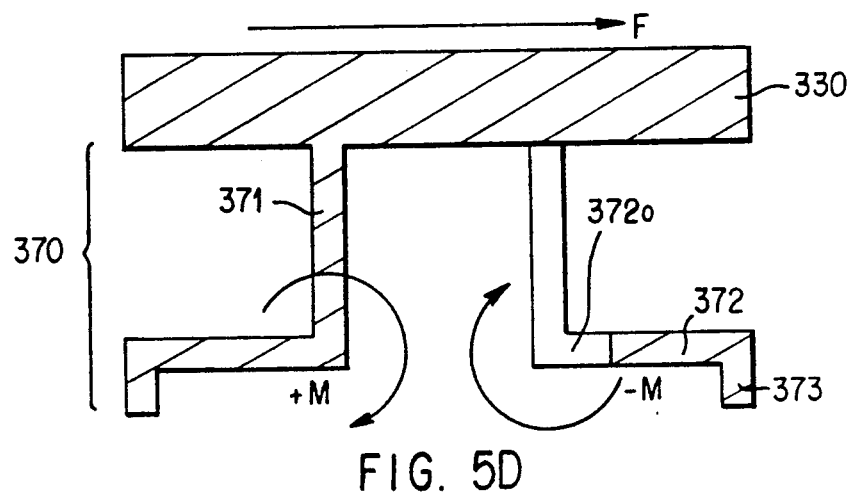
FIG. 5D is a cross-section of another hollow tubular bearing pad according to the present invention.
Figure 5E:
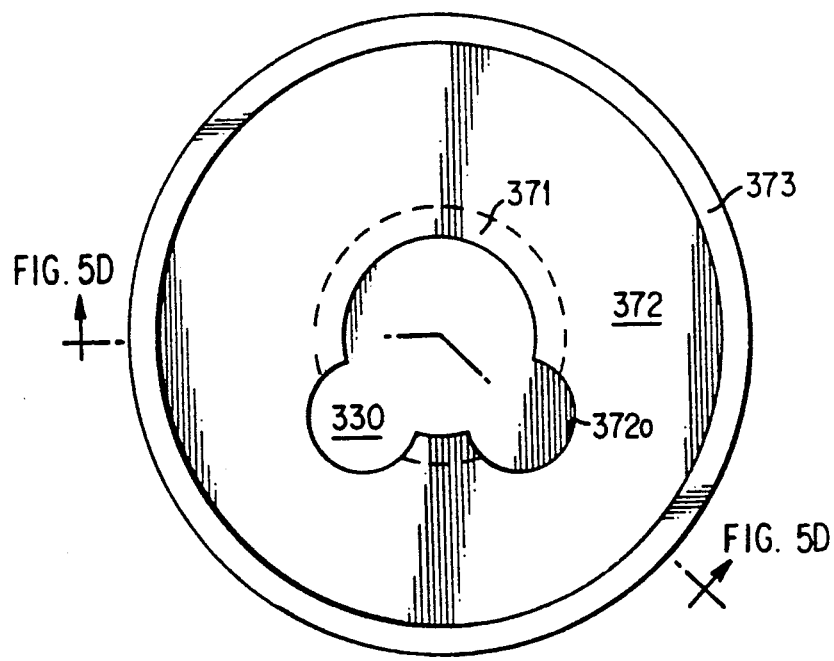
FIG. 5E is a bottom view of the bearing pad of FIG. 5D with hidden lines indicated in phantom.

FIGS. 5D and 5E illustrate a modified hollow tubular bearing pad according to the present invention. Like the bearing pad shown in FIGS. 5A, 5C, this bearing pad includes a hollow tubular primary support portion 371, a membrane-like secondary support portion 372 and a circumferential tertiary support portion 373. However, the bearing pad shown in FIGS. 5D–5E has a much thinner primary support portion 371. Hence, this portion is much more flexible. Additionally, the openings 372o formed in the membrane 372 extend completely through the membrane 371 and extend up to the pad portion 330. Consequently, the openings 372 divide the primary support portion 371 into a plurality of beams formed from a tubular shape. Additionally, in the illustrated embodiment, the openings 372o are nonsymmetrically provided so as to bias the primary support portion toward the direction in which the openings 372o are provided. It should be noted that the openings 372o could be omitted or have a different shape and that additional structural features such as openings and slots could be provided to alter the deflection characteristics of the bearing.

FIG. 5D also schematically illustrates the deflection characteristics of the bearing pads shown in FIGS. 5D–5E. Specifically, when a force is applied in the direction indicated by arrow F in FIG. 5D one end of the support structure is lifted upward by a positive moment ($+M$) and the opposite side is pushed downward by a negative moment ($-M$). This causes the pad to deflect such that a hydrodynamic wedge is formed between the pad surface and the shaft portion being supported.

The modified bearing pad construction illustrated in FIGS. 4A–4E and 5A–5E can be formed of modular components in the manner illustrated with respect to FIGS. 2 and 3, namely, by providing a separate bearing pad portion and support portion and complementary connectors for releasably securing the pad portion to the support portion and/or the bearing pad in the carrier. However, this is not necessary, particularly for those bearing pads which are easy to form integrally.

In accordance with another aspect of the present invention, the carrier portion 10 of the bearing may be formed so as to provide a deflectable or deflecting support for the bearing pads 20. Essentially, this involves providing structural features (beams, membranes and the like) in the carrier structure such that the carrier operates as a flexible support.

FIG. 13A illustrates a relatively simple flexible carrier structure 10. The carrier 10 is formed with radially extending inner and outer grooves so as to divide the carrier into a pad support section 105, a continuous, relatively narrow primary support portion 106 and a secondary support portion 107. The secondary support portion 107 in this embodiment is simply a flattened base. The carrier is relatively rigid and does not provide any flexibility in the vertical direction. Nevertheless, the provision of the radially extending grooves allow some pivoting flexibility of the pad support portion 105. FIG. 13A also illustrates the use of a locating post 102 as discussed below to accurately position a bearing pad 20.

FIG. 13B shows a bottom view of the bearing pad 20 supported in the bearing of FIG. 13A. As shown therein, the tertiary support portion 373 of the bearing pad includes a sleeve portion 373S which can be fit over the locating post 102 to accurately position the bearing pad 20. The bearing pad 20 is otherwise similar to those shown in FIGS. 5A–5E. Naturally, other types of bearing pads could be used with the type of carrier shown in FIG. 13A.

FIGS. 14A and 14B illustrate a bearing construction which includes a relatively flexible carrier 10. Specifically, the carrier 10 includes a cantilevered bearing support portion 105 which includes a pad support surface 105a and a continuous outer peripheral beam 105b providing a cantilevered support for the support surface 105a and a radially inward extending circumferential surface 105c which is cantilevered from the primary support portion 106. The primary support portion 106 is in turn supported on a membrane-like secondary support portion 107 which supported on two circumferential legs 108. This construction provides a spring-like support for the bearing pads 20 owing to the flexibility of the secondary support portion 107 and the cantilever support and construction of the pad support surface 105.

The bearing shown in FIGS. 14A and 14B includes frustoconical bearing pads 20 generally similar to those described above in connection with FIGS. 3C and 3D. However, FIG. 14A shows the possibility of using a pad portion 23 which is composed of a structural base member 232 having a portion of a different material such as a hardened rubber, polymeric or other synthetic bearing material cap 231 molded or otherwise formed thereon. Of course, any of the pads disclosed herein could be used with this type of carrier.

FIGS. 15A and 15B illustrate another flexible carrier construction according to the present invention. In this case, the primary and secondary support portions 106 and 107 are similar to those shown in FIG. 13A. However, the pad support portion 105 has a double cantilevered construction which includes a pad support surface 105a mounted on a radially inner circumferential beam 105b which is cantilevered on a circumferential surface 105c which in turn is supported on a circumferential beam 105d which is cantilevered on a circumferential surface 105e. This construction gives the pad support portion a good deal of flexibility in the vertical direction. To provide additional flexibility, a secondary support portion 107 could be mounted on circumferential beams as with the bearing of FIGS. 14A and 14B.

The bearing pads 20 mounted on the flexible carrier of FIGS. 15A and 15B are simply coin-like flattened pads. These pads can be formed of any suitable high performance material such as silicon carbide, bronze, steel or polymeric materials. Additionally, according to another aspect of the present invention, detailed below, the pads 20 can be formed of a so called "smart" or "intelligent" material capable of responding to sensed operating conditions. Of course, any of the other bearing pads of the present invention could be used with this type of carrier, if desired.

Figure 16A:
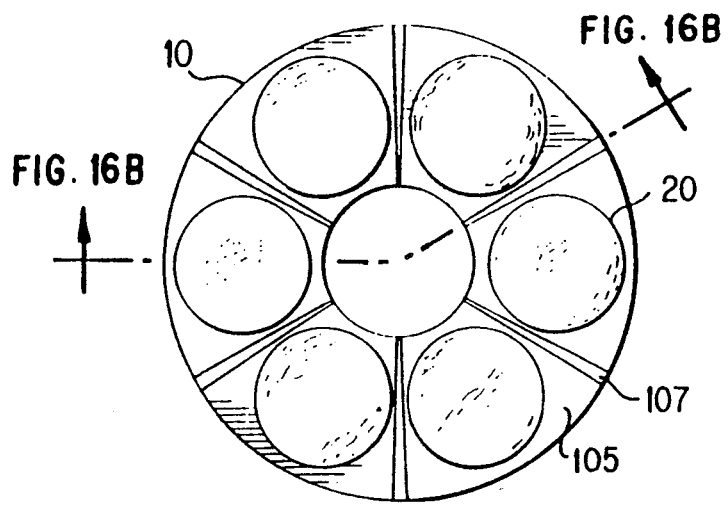
FIG. 16A is a top view of a bearing which includes a beam mounted carrier supporting a plurality of bearing pads.
Figure 16B:
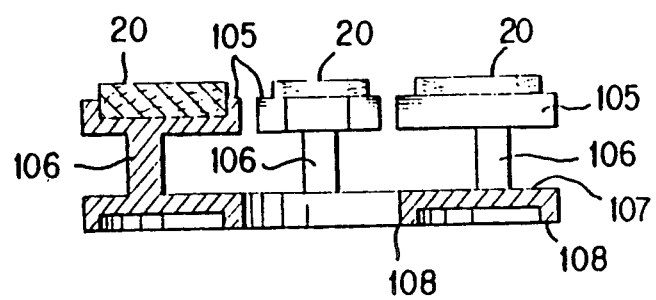
FIG. 16B is a cross-section of the bearing of FIG. 16A.

FIGS. 16A and 16B illustrate a beam mounted carrier construction according to the present invention. This construction differs from the previously described flexible carrier constructions in that the bearing pads 20 are supported on individual discrete pad support surfaces 105. Each of the pad support surfaces 105 is supported on a support structure which includes a primary support portion 106, a secondary support portion 107 and a tertiary support portion 108. In the illustrated embodiment, the primary support portion 106 is a single vertically extending beam, the secondary support portion 107 is a membrane-like member and the tertiary support portions 108 is formed as two continuous circumferential beams. Again, coin-like pads are illustrated. Naturally, other types of pads can be used.

There are numerous possible arrangements for the support structure, particularly when the bearing pads are to be mounted on discrete pad support surfaces. Examples of other thrust bearing carrier shapes are shown in FIGS. 21–30. The difference between these bearings and the bearing construction shown in FIGS. 16A and 16B primarily resides in different constructions of the primary support portion, the secondary support portion and the tertiary support portion. In discussing beam mounted carriers, whether thrust, radial or combined thrust and radial, it is useful to visualize the carrier as being formed from a cylindrical blank machined with cuts, grooves and bores to define a support structure. Of course, the carriers can be made by machining but it is not necessary to do so; the carriers can be molded, cast or formed by other means.

Figure 21:
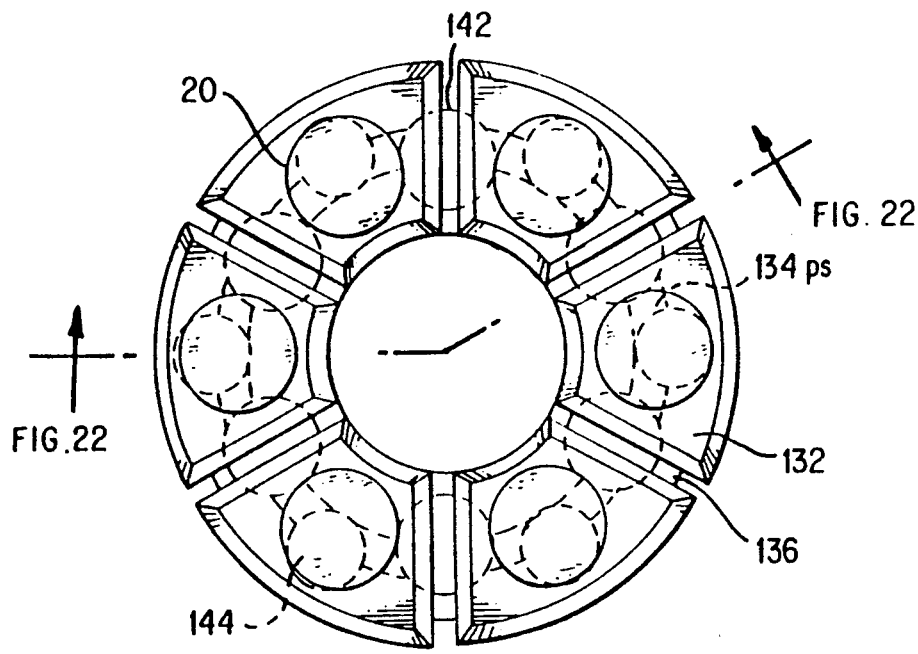
FIG. 21 is a top view of a thrust bearing according to the present invention having a two legged beam mounted carrier.
Figure 22:
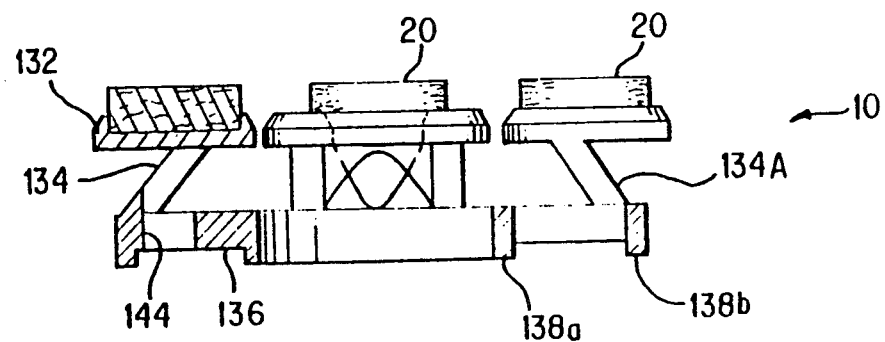
FIG. 22 is a side cross-section of the thrust bearing of FIG.21.
Figure 23:
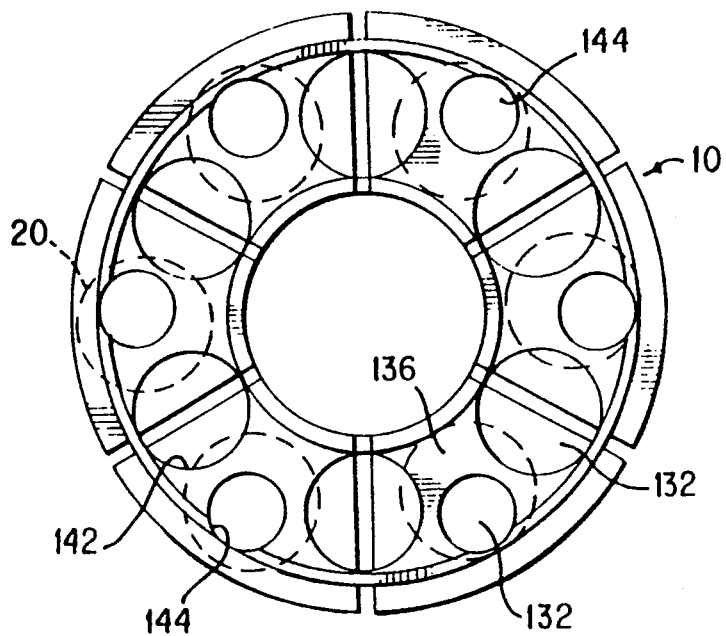
FIG. 23 is a bottom view of the bearing of FIG. 21.
Figure 24:
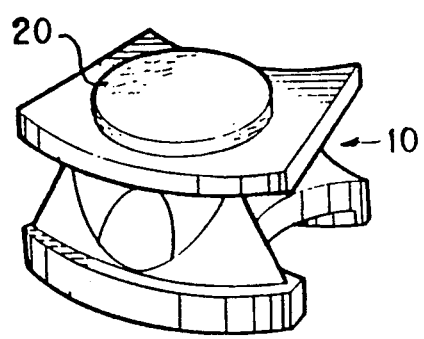
FIG. 24 is a perspective view of a segment of the bearing of FIG. 21.

One such other carrier shape is illustrated in FIGS. 21–24. A top view of the bearing is shown in FIG. 21; a cross-section of the bearing is shown in FIG. 22; a bottom view of the bearing is shown in FIG. 23 and a perspective view of the bearing is shown in FIG. 24. The carrier 10 shown in FIGS. 21–24 is similar to the bearing of FIGS. 16A and 16B with two notable exceptions. First, the bearing of FIGS. 21–24 includes an angled or slanted support beam 134A rather than a vertical support beam as in FIG. 16A. Second, the carrier 10 includes additional holes 144 which extend through the support beam 136 to form a cylindrical opening through the slanted or angled beam 134 so as to form elliptical openings in the support beam. The elliptical openings divide the beam into a pair of complex ligaments, the shape of which can be appreciated with reference to the perspective view of FIG. 24. The provision of the openings 144 and consequent division of the slanted or angled beams 134A into complex ligaments significantly increases the flexibility of the carrier support structure of the bearing pads 20 shown in FIGS. 21-24 as compared to the bearings shown in FIGS. 16A and 16B. Thus, the pad support surfaces 132 of the bearing of FIGS. 21-24 deflect in response to a lighter load than do the pads 132 of the bearing shown in FIGS. 16A and 16B. It follows that the carrier shown in FIGS. 21-24 is more well suited for supporting bearing pads for light loads and the bearing shown in FIGS. 16A and 16B is more well suited for carrying bearing pads for heavier loads. Further, the provision of angled or slanted support beams such as beam 134A, with or without openings to divide the beam into complex ligaments, increases the flexibility of the pad support surface in the vertical direction since a vertically applied load creates a moment which tends to cause the beam to deflect toward the center or inner diameter of the bearing and thereby eliminate centrifugal leakage of the lubricating fluid.

The bearing pad 20 shown is a simple coin-like bearing pad. The pad 20 can be formed of silicon carbide or some other high quality bearing material. Of course, any other form of bearing pad disclosed herein could be used.

Figure 23A:
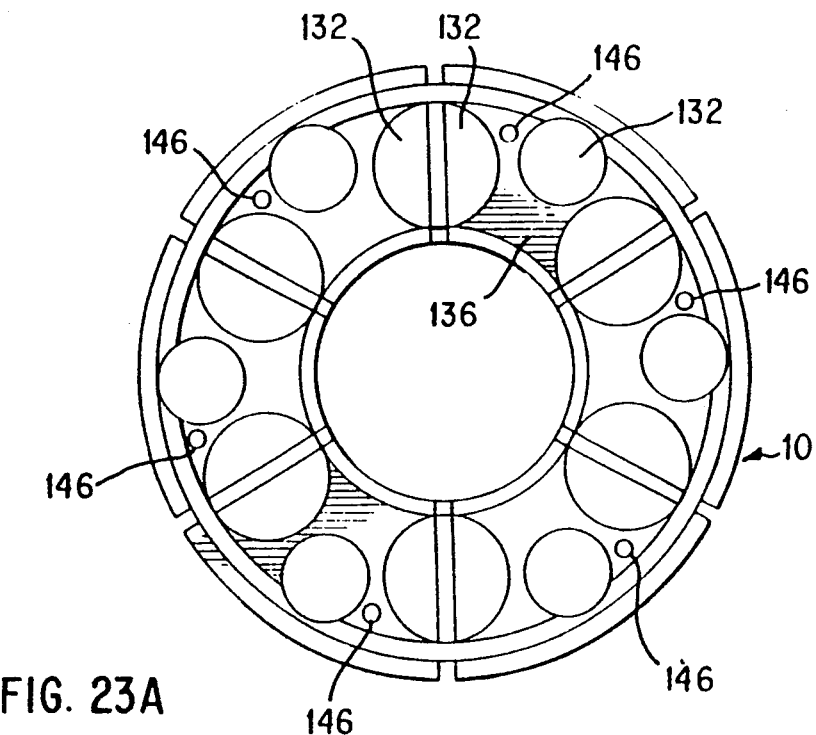
FIG. 23(A) is a bottom view of a modified version of the bearing of FIG. 21.

FIG. 23A shows a bottom view of a bearing of the type shown in FIGS. 21-24 in which additional holes 146 are formed in the membrane or support beam 136 to enhance the flexibility of the beam or membrane 136 even further. As illustrated in FIG. 23A, the holes 146 are formed nonsymmetrically with respect to each pad support segment. The provision of these holes in such a nonsymmetrical fashion results in a bearing in which the pad supports, and hence the pads, tend to deflect more easily in one direction than in the other direction. In other words, the bearing pads are biased in one direction by the provision of nonsymmetrical openings in the carrier support structure. Naturally, such nonsymmetrically disposed openings can be provided in any of the bearing constructions of the present invention in which it is desired to bias the bearing pads in one direction. It may even be desirable to provide the nonsymmetrically disposed openings or holes such that only selected ones of the bearing pads 20 are biased.

Figure 25:
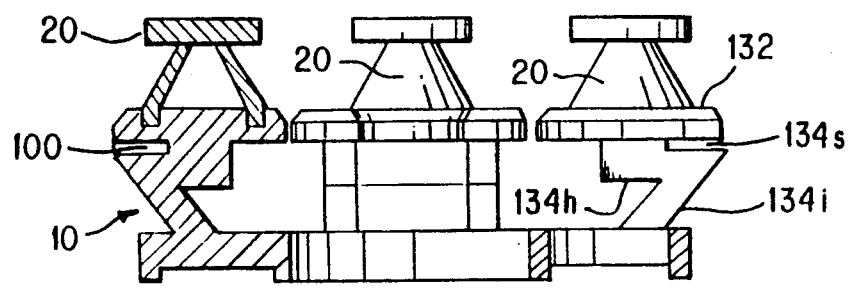
FIG. 25 is a cross-section of another bearing according to the present invention.

FIG. 25 is a cross-sectional view of another bearing according to the present invention. In accordance with this construction, the bearing pad 20 is supported on a pad support surface 132 supported on a stub 134S which is in turn supported on a horizontally oriented beam portion 134H which is in turn supported on an inversely angled beam portion 134I. In other respects, the carrier construction is similar to that of the previously described bearings. By virtue of this construction, the carrier 10 has a great deal of flexibility in one direction but it is extremely rigid in the opposite direction. A piezoelectric element 100 may be located between the horizontal beam portion and the pad as shown to allow active control of pad tilting. A hollow frustoconical bearing pad 20 is shown. However, the carrier 10 is able to support other forms of bearing pads of the type described herein.

Figure 26:
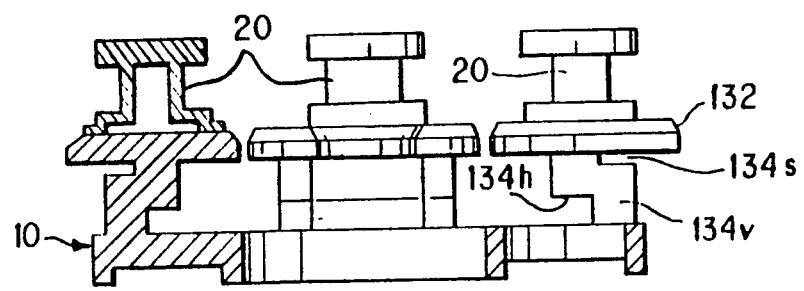
FIG. 26 is a cross-section of another bearing according to the present invention.

A similar construction is illustrated in FIG. 26. The difference between the bearing carrier 10 illustrated in FIG. 26 and the bearing carrier 10 illustrated in FIG. 25 is that the carrier 10 of the bearing illustrated in FIG. 26 uses a vertical beam portion 134V rather than an inversely angled beam portion 134I. The carriers 10 are similar in all other respects. The absence of an angled beam in the bearing of FIG. 26 tends to give the bearing more rigidity in the vertical direction. On the other hand, the membrane type bearing pad 20 shown in FIG. 26 is more flexible than the hollow cone bearing pad 20 of FIG. 25. Naturally, like all other carrier constructions described herein, other forms of bearing pads may be used.

Figure 27:
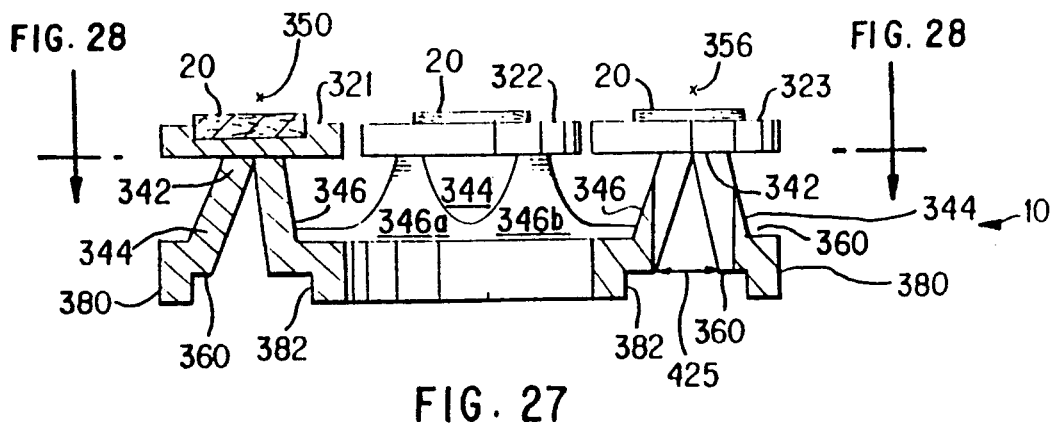
FIG. 27 is a side cross-section of another bearing having a beam mounted carrier construction according to the present invention.
Figure 28:
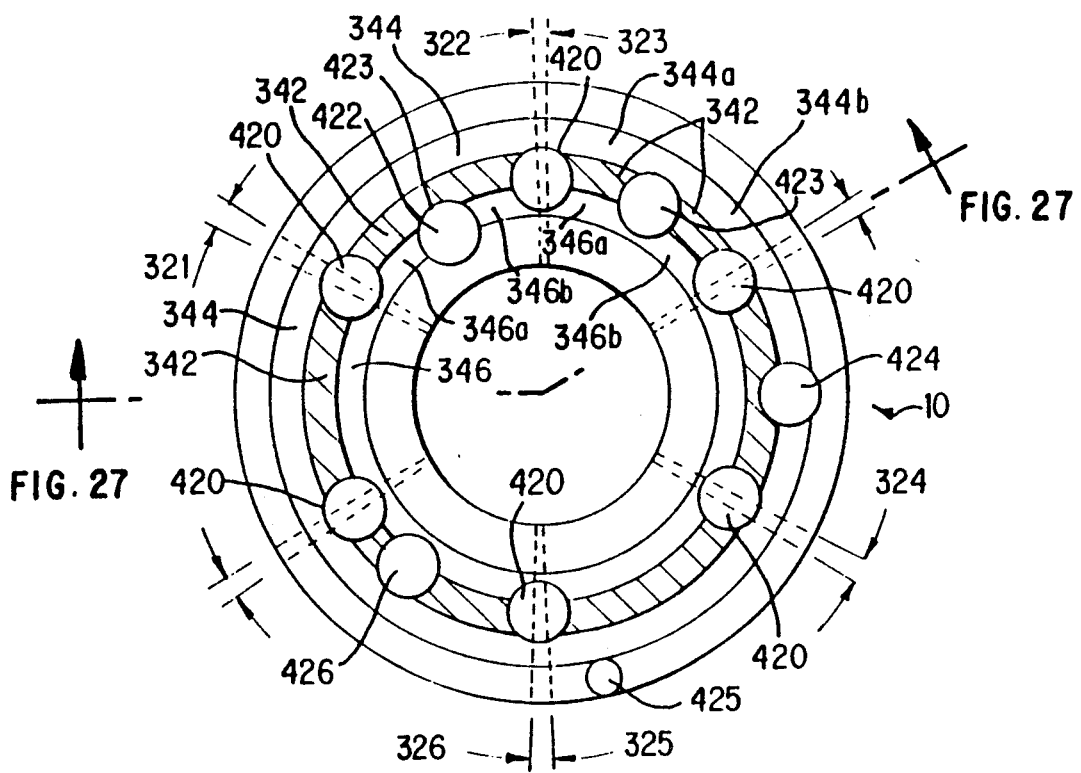
FIG. 28 is a top cross-section of the bearing construction of FIG. 27.

FIGS. 27-28 illustrate another embodiment of the bearing construction of the present invention. As shown in the drawings, this bearing includes a carrier 10 having a plurality of bearing pad supports 321-326 (shown in phantom in FIG. 28). Each of the bearing pad supports 321-326 are supported on a support surface 342 of a carrier support structure. The carrier support structure includes a primary support portion composed of a pair of nested frustums supported on a secondary support portion which includes a split peripheral membrane 360 which is supported on a tertiary support portion which includes a pair of peripheral beams 382. The peripheral beams 380 and 382 are similar to those of the previously described constructions. The membrane 360 differs from the membrane in previously described constructions since the membrane 360 is radially split by the groove formed in the bottom of the bearing support structure which forms the nested frustums. The inner frustum is inverted with respect to the outer frustum such that the mean center lines of the frustums merge at a point 350 above the pad support surface 342 and have a cross-section which appears similar to an inverted V. Since the center lines of the frustums intersect at point 350 above the support surface, the primary support structure supports the bearing pad for pivoting about a point above the pad surface. This ensures proper deflection.

The beams 346 and 344 which support the bearing pad can be angled toward one another at the same angle, angled toward one another at different angles, one beam angled and one beam not angled, and angled in the same direction. Of course, variations in the degree of angling of the beams in the primary support structure impacts the deflection characteristics of the bearing.

A plurality of holes or openings 420 disposed symmetrically about the bearing support structure divide the nested frustum or inverted V structure into a plurality of support beams 344, 346 and divide the apex of the nested frustums so as to define the pad support surfaces 342. Thus, for example, the pad support 321 is supported on a pad support surface 342 by a pair of complex support beams 344 and 346 which are tapered toward one another and have a complex geometrical configuration defined by the cylindrical extending openings passing through the nested frustum section. As best shown in FIG. 27, the center lines of the beams 344 and 346 intersect at a point 350 above the pad surface to ensure proper pivoting support. The individual beams 344 and 346 are supported on a peripheral membrane 360 which is split by the groove which defines the frustums. The membrane is supported by peripheral beams 380, 382. As discussed above, the peripheral beams 380, 382 and the peripheral membrane 360 can be circumferentially split to define individual beam supports.

Numerous modifications to the carrier support structure are possible. For example, deflection of the support structure can be modified by changing the angle of the beams, changing the location of the holes or openings which define the legs, varying the length of any of the beams or membranes, and changing the width or thickness of any of the beams or membranes. In order to illustrate a number of these possibilities, FIGS. 27 and 28 depict a different support structure for each of the pad support surfaces, 321-326. It should be understood that these various support structures are shown in a single bearing for purposes of illustrating the present invention. In normal use, each of the pad support 321-326 would have a similar, though not necessarily identical, support structure to assure uniform performance.

The support structure for bearing pad support 322 differs from that of pad support 321 by virtue of the provision of a hole or opening 422 which extends through the beam 346 so as to divide the beam 346 into a plurality of beams or sub-beams 346(a) and 346(b). If, like the opening 422, the diameter and positioning of the opening is such that the beam is completely separated, the beam is divided into separate beams. On the other hand, if the opening only partially separates the beam (e.g. opening 423) the beam is divided into sub-beams. As shown in FIG. 27, the opening 422 forms an elliptical opening in the side of the beam 346 such that, as viewed in FIG. 27, radially outer beam 344 is visible. By virtue of this construction, the pad support 322 is supported by three angled ligaments or beams, 344, 346(A) and 346(B).

Bearing pad support 323 is supported by four angled beams or ligaments 344(a), 344(b), 346(a) and 346(b). This structure is achieved by providing a hole or opening 423 which extends through both beam 344 and beam 346 and divides the pad support surface 342 into two sections.

It should be noted that with respect to all of the modifications discussed herein, the size of the openings should be selected based upon the degree to which the beams 344 and 346 are to be divided into separate beams. In some instances, it may be desirable to completely separate the beam sections in which case a larger opening would be used. In other instances, such as that illustrated with respect to the support of bearing pad support 323, it is desirable to subdivide the beam at some point along the sidewall of the beam. It should also be noted that although the drawings only show the provision of one opening for bearing pad support structure to divide the beams 344 and 346. It is possible that two or more openings similar to that of the openings 422-426 shown in FIG. 28 could be provided so as to divide the beams 344, 346 into three or more beams or sub-beams. As always, a determination of the type of support to be employed depends on the desired performance characteristics. Generally, dividing the beams into separate beams or sub-beams makes the support structure more flexible. By making the support structure more flexible in one direction as with the support structure for bearing pad supports 322, 324 and 326 the bearing pad supports are biased in a predetermined direction.

The support structure for bearing pad support 324 is similar to that for bearing pad support 322 except that the opening 424 extends through the outer support beam 344 rather than the inner support beam 346. Thus, like the bearing pad support 322, the bearing pad support 324 is supported by three angled legs.

The support structure for pad support 325 is similar to that for pad support 321 except that an opening 425 is provided through the outer peripheral beam 380 and peripheral membrane 360 in a nonsymmetrical position. Thus, the bearing pad 325 is biased in a predetermined direction, i.e., the direction of greatest flexibility caused by the provision of the opening 425.

The support structure for the pad support 326 is similar to that of pad support 322 except that the opening 426 which divides the beam 346 is provided in a nonsymmetrical fashion so as to bias pad support 326 in the direction of greater flexibility, i.e., the direction of the smaller, more flexible beam.

Each of the pad supports 321-326 is formed with a bore or other opening to allow it to support a bearing pad 20. While a coin-like bearing pad is shown, it is understood that any of the bearing pads disclosed herein could be used. Further, the pads 20 could be releasably secured to the pad supports as discussed herein.

Naturally, any combination of the support structures illustrated in FIGS. 27, 28 could be employed to achieve desired performance characteristics.

Figure 29:
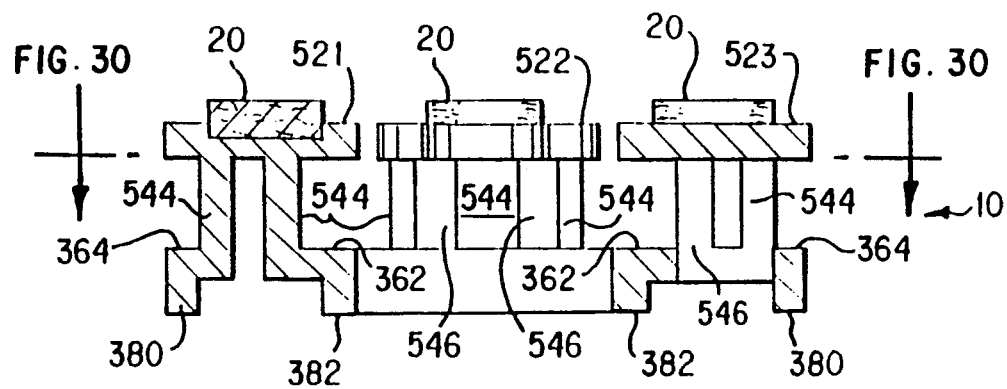
FIG. 29 is a side cross-section of another bearing construction having a beam mounted carrier construction according to the present invention.
Figure 30:
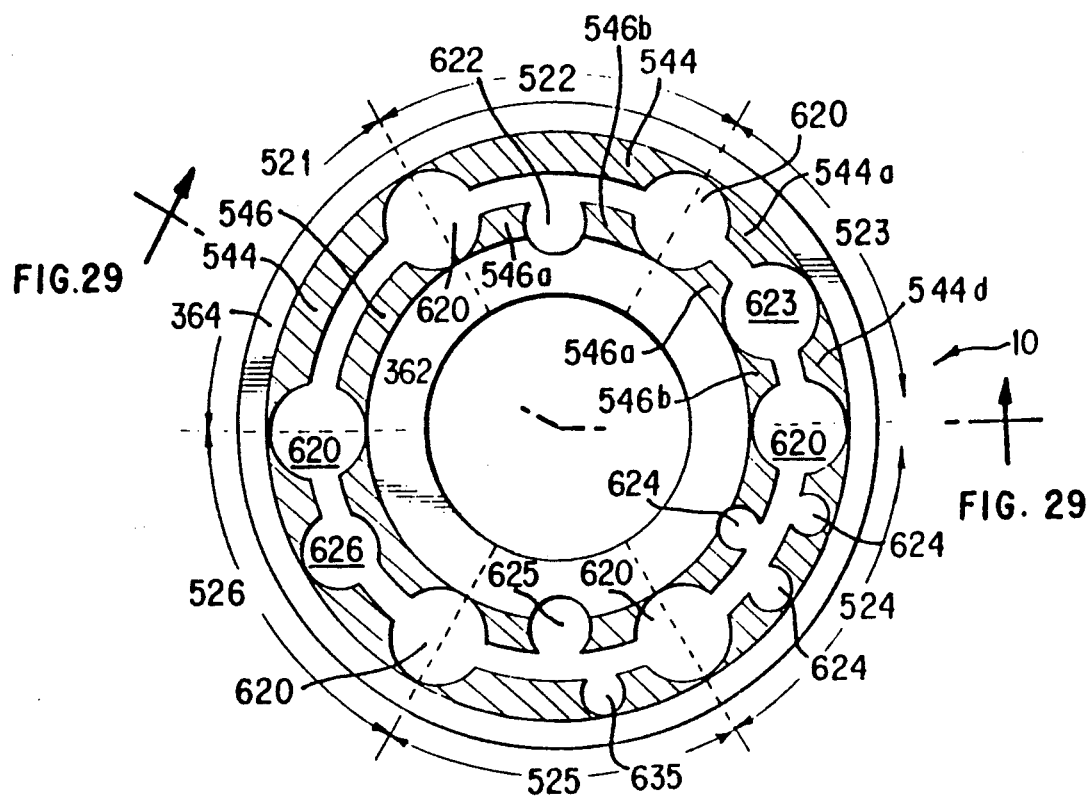
FIG. 30 is a top cross-section of the bearing construction of FIG. 29.

FIGS. 29-30 illustrate another embodiment of the bearing of the present invention. As shown in the drawings, this bearing includes a carrier 10 having a plurality of pad supports 521-526 (location shown in phantom in FIG. 30). Each of the pad supports 521-526 are unitary with, and supported on, a carrier support structure. Generally, the carrier support structure includes at least a primary support structure including an inner circumferential support beam 546 and an outer circumferential support beam 544, a secondary support portion including an inner peripheral membrane 362 and an outer peripheral membrane 364 and a tertiary support portion including an inner peripheral support beam 382 and an outer peripheral support beam 380. As best shown in FIG. 29, the circumferential support beams 544, 546 are defined in part by a deep circumferential channel extending from the bottom of the carrier to the pad support surface. The support beams are further defined by a plurality of holes or openings 620 disposed symmetrically about the bearing pad support structure which separate the beams 544, 546 from adjacent beams. Thus, for example, the support pad 521 is supported on a pair of beams 544 and 546 which beams have generally accurate side walls. As mentioned earlier, the beam support structure also includes membranes 364, 362 and peripheral beams 380, 382.

Numerous modifications to the carrier support structure are possible. In order to illustrate a number of these possibilities, FIGS. 29 and 30 depict a different support structure for each of the pad supports 521-526. As with the previously described embodiment of FIGS. 27-28, these various support structures are shown in a single carrier 10 for the purpose of illustrating the present invention. In normal use, each of the pad supports 521-526 would have a similar, though not necessarily identical, support structure to assure uniform performance.

The support structure for pad support 522 differs from that of pad support 521 by virtue of the provision of a hole or opening 622 which extends through the inner circumferential beam 546 so as to divide the beam 546 into a plurality of beams 546a and 546b. By virtue of this construction, the pad support 522 is supported by three vertically extending beams or ligaments 544, 546a and 546b.

The pad support 523 is supported by four vertically extending beams or ligaments 544a, 544b 546a and 546b. This structure is achieved by providing a hole or opening 623 which extends through both beam 544 and beam 546. The thinner beams which result from this modification would naturally have greater flexibility than the support structure for pad supports 522 and 521.

The pad support 524 is supported by five relatively thin vertically extending beams or ligaments. This structure is achieved by providing a hole or opening 624 to divide the inner beam 546 into two beams and providing two holes 624 to divide the outer beam 544 into three beams.

The carrier support structure for pad support 525 is similar to that for pad support 522 except that an additional opening 635 non-symmetrically divides the outer beam 544 into two beams. By virtue of the non-symmetrical division of the outer beam 544, the bearing pad is biased in the direction of greater flexibility.

The carrier support structure for pad support 526 is similar to that for pad support 522 except that the outer beam 544 is split rather than the inner beam 546. Further, the opening 626 is somewhat larger than the opening 622 such that a groove is formed on the outer periphery of the inner beam 546 so as to make the inner beam 546 somewhat more flexible.

Naturally, any combination of the support structures illustrated in FIGS. 29, 30 could be employed to achieve desired performance characteristics.

Each pad support surface is formed with a bore or similar opening in which the bearing pad 20 is mounted. The bearing pads 20 may be of any of the forms disclosed herein not just the coin-like pads shown. Further, if desired, the pads can be releasably secured to the pad supports as discussed herein.

FIGS. 29A, 29B, 30A and 30B illustrate in detail a thrust bearing having a carrier 10 in which each of the pad supports 521A of the carrier support structure are very similar to that used to support pad support 521 in FIGS. 29 and 30. The carrier construction is different, however, insofar as the beams 544A and 546A are circumferentially narrower and vertically shorter than their counterparts in the carrier 10 illustrated in FIGS. 29 and 30. Naturally, shorter beams are more rigid than the comparatively longer beams and narrow beams are less rigid than comparatively wider beams. Moreover, the beam 544A is radially narrower than the beam 546A; whereas in the bearing illustrated in FIGS. 29 and 30, the beams 544 and 546 have equal widths. The difference in radial thickness is compensated for since the large opening 620 which defines the circumferential extent of the beams 544A and 546A is arranged such that beam 544A is significantly wider in the circumferential direction than is beam 546A. Finally, it should be noted that the openings 620 are significantly larger than the corresponding openings 620 in the bearing carrier construction of FIGS. 29 and 30. Naturally, the larger openings increases the flexibility of the support structure defined thereby.

By virtue of the beam mounted pad support constructions described above, the bearing pads 20 are supported on a carrier which is capable of deflection to alter the orientation of the bearing pads 20. Such a construction is particularly suitable for coin-like bearing pads 20 since the required flexibility can be designed into the carrier rather than the pad 20. However, any of the bearing pads disclosed herein could be used if necessary to achieve the desired deflections. Nevertheless, it is presently contemplated that, under normal circumstances, coin-like bearing pads of the type illustrated in FIGS. 16A and 16B would be used since the provision of individually controllable pad support surfaces 105 and their support on the support structure 106, 107, and 108 enables optimal deflection. Again, the bearing pads may be constructed of high performance bearing materials or may be constructed of smart or intelligent materials to allow dynamic or active control of wedge formation as discussed below.

Figure 20A:
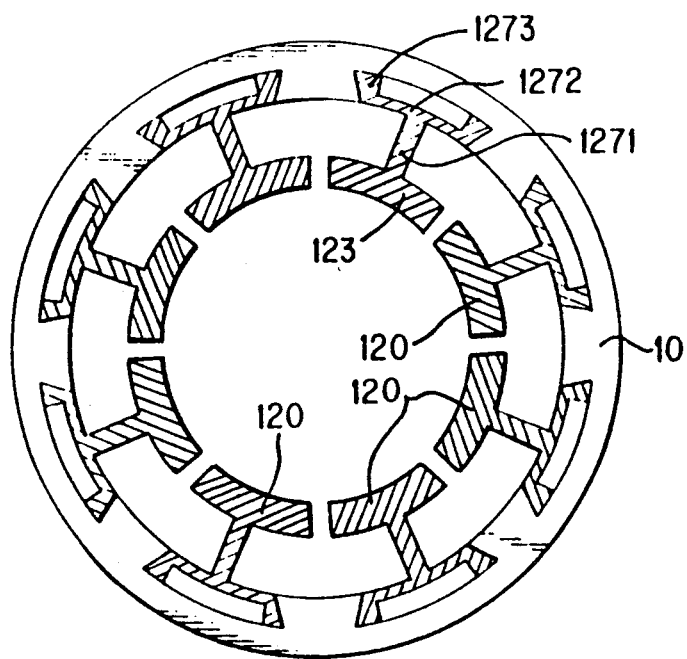
FIG. 20A is a side view of dovetail form of a modular radial bearing according to the present invention.

Another form of modular bearing construction is illustrated in FIGS. 20A-20E. This type of modular construction is most suitable for radial or journal bearings. Specifically, as best shown in FIG. 20A, the bearing includes a carrier 10 having a plurality of longitudinal dovetail grooves formed therein. The dovetail grooves are circumferentially spaced about the inner periphery of the carrier 10. A plurality of dovetail bearing pads 120 are secured in the dovetail grooves formed in the carrier 10. The dovetail bearing pads 120 include a pad portion 123 and a support portion 127. In the illustrated embodiment, the support portion includes a primary support portion 1271, a membrane-like secondary support portion 1272 and a tertiary support portion 1273. In accordance with one aspect of the present invention, the tertiary support portion has a dovetail outer configuration which is complimentary to the dovetail grooves formed in the carrier 10. By virtue of the dovetail configuration of the lower end of the bearing pads 120, the bearing pads can be slid into the longitudinal grooves from a axial end of the carrier 10 such that the pads 120 are locked in the radial direction with respect to the carrier 10. This way, the dovetail bearing pads 120 are quickly and releasably securable to the carrier 10. Further, their position within the carrier 10 is not affected by rotation of the shaft which the bearing pads 120 support. However, without more the bearing pads 120 would be axially slidable within the carrier 10. If desired, the bearing pads 120 can be easily locked with respect to the carrier through the provision of an end plate a locking bolt or some similar mechanism.

In accordance with another aspect of the present invention, the dovetail bearing construction shown in FIG. 20A can be part of a modular system. Specifically, the modular system can include a wide variety of dovetail bearing pads 120 each having a lower portion which is formed complimentary to the longitudinal grooves formed in a standard dovetail-type carrier. In this way, a standard carrier can serve as the support for a wide variety of bearing constructions.

FIGS. 20B-20E illustrate various dovetail bearing pad constructions according to the present invention. Each of the dovetail bearing pad constructions has a lower end with a shape which is complimentary to the shape of the dovetail grooves formed in the carrier 10 of FIG. 20A. Consequently, any of the bearing pads shown therein could be mounted in the carrier 10 of FIG. 20A to suit a particular need. Additionally, the modular system can be further varied by providing modular bearing pads having different radial (or vertical as viewed in the drawings) dimensions. In this way, a single carrier 10 can be adapted to support shafts of varying diameters.

Figures 20B, 20C:
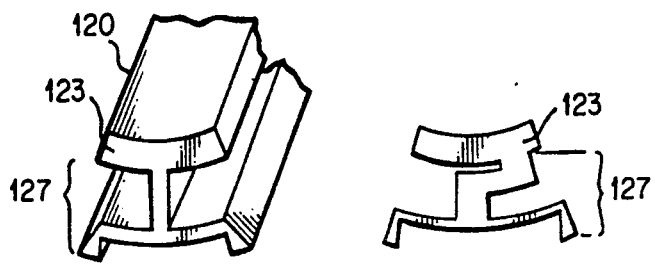
FIG. 20B is a partial perspective view of a bearing pad for use in the bearing of FIG. 20A.
FIG. 20C is a side view of a modified bearing pad.

FIG. 20B shows a modular dovetail bearing pad of the same general type shown in FIG. 20A. The bearing pad 120 includes a pad portion 123 and a support portion 127. In this case, the support portion 127 includes a vertical or radially extending single beam serving as a primary support portion. A circumferential or horizontally extending membrane as a secondary support portion and a pair of dovetailed support legs as a tertiary support portion.

FIG. 20C shows a similar modular dovetail bearing pad except that the primary support portion includes a non-symmetrical beam network consisting of a pad support beam, circumferential cantilever beam and a vertical beam supporting the beam network on the membrane of the second support portion. Because of the non-symmetrical nature of this bearing pad, a bearing constructed with such a pad would be unidirectional rather than bidirectional.

Figures 20D, 20E:
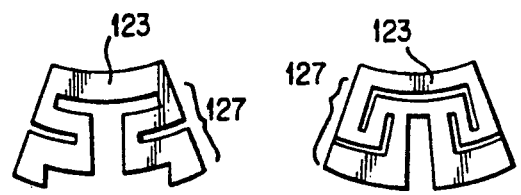
FIG. 20D is a side view of another bearing pad.
FIG. 20E is a side view of another form of bearing pad.

FIG. 20D shows a modular dovetail bearing pad in which the pad support portion 123 is undercut and supported at its ends by radially extending beams. These radially extending beams are supported in a cantilever fashion by circumferential beams which are supported on radial beams which in turn are supported on circumferential beams and finally supported on radial beams. This beam-on-beam construction gives the dovetail construction of FIG. 20D significant flexibility.

FIG. 20E shows a dovetail bearing pad with a different form of beam-on-beam construction. In this case, the pad portion 123 is undercut and supported by radially extending beams which are supported by a circumferentially extending beam which are supported in a hanging fashion by another radial beam which in turn is supported on a fixed base. In the case of FIG. 20E, the openings formed to define the pad portion and support network are relatively thin compared to the openings formed in the previously described dovetail bearing pad construction.

In addition to the forms of dovetail bearing pads shown in FIGS. 20B-20E, it is possible to use solid dovetail bearing pads such as those shown in, for example, FIGS. 31-34. Such solid bearing pads which can only deform and cannot deflect are generally used in cases where the carrier includes a beam support network for flexibly supporting the bearing pads.

Generally, solid bearing pads will be formed of a high performance material such as silicon carbide. On the other hand, deflectable bearing pads such as those shown in FIGS. 20B-20E are likely to be formed of plastic, bronze or steel.

Figure 31:
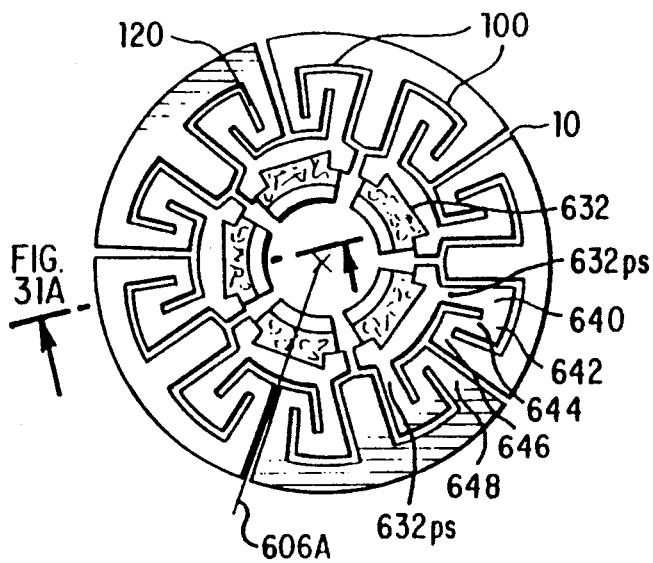
FIG. 31 is a side view of another dovetail journal bearing construction in accordance with the present invention.
Figure 31A:
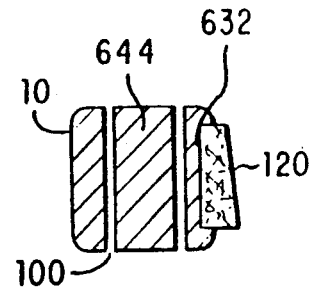
FIG. 31A is a radial cross-section of a portion of the bearing illustrated in FIG. 31.

FIGS. 31 and 31A illustrate another dovetail of a journal bearing in accordance with the present invention. The bearing construction illustrated in FIGS. 31 and 31A is bidirectional, i.e., the bearing is capable of supporting a shaft for either clockwise or counterclockwise rotation as viewed in FIG. 31. The bearing is bidirectional because the pad supports are symmetrical about their center line, which are defined as the radial extending line passing through the bearing major axis and the geometric center of the pad. The bearing of FIGS. 31 and 31A includes a carrier 10 which is formed with a plurality of thin radial and circumferential slits to define a plurality of circumferentially spaced bearing pad support surfaces which support a plurality of bearing pads 20.

In particular, each bearing pad support surface 632 is supported by a beam support structure at two pad support surfaces 632ps. The beam network connected to the bearing pads at each pad support surface 632ps is identical yielding the symmetrical construction of the bearing which makes the bearing bidirectional. For purposes of simplifying this description, only the network of beams which supports the bearing at one pad support surface will be described since the other pad support surface is supported in an identical fashion. Thus, as shown in FIG. 31, a first, generally radially extending, beam 640 is connected to the bearing pad support surface 632. A second, generally circumferential, beam 642 is connected to the radially outermost end of beam 640. A third, generally radial, beam 644 extends radially inward from the beam 642. A fourth, generally circumferential, beam 646 extends from the radially innermost portion of the beam 644. A fifth, generally radial beam 648 extends radially outwardly from a beam 644 to the housing portion of the support structure. In summary, each bearing pad support surface 632 in the bearing illustrated in FIG. 31 is supported by ten beams and the carrier housing. It should also be noted that, the cut or slit formed below the pad support surface introduces additional flexibility such that the pad support surface acts like a spring-like membrane.

In the illustrated embodiment, simple dovetail bearing pads 120 are used. However, because of the modular nature of this bearing construction, other forms of bearing pads could be used. For instance, dovetail bearing pads such as those shown in FIGS. 20A-20E could be used or other non-dovetail bearing pads such as those disclosed herein could be used.

FIG. 31A is a radial cross-section of FIG. 31 showing the third beam 644, the bearing pad support surface 632, the bearing pad 120 and the housing or outer periphery.

As detailed below, piezoelectric elements 100 could be provided within the support structure to allow selective adjustment of the deflection characteristics.

Figure 32:
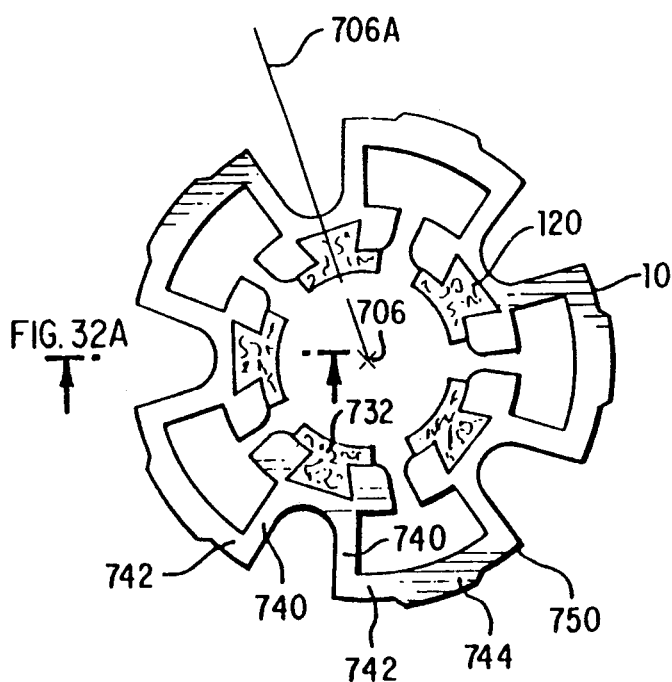
FIG. 32 is a side view of another journal bearing construction in accordance with the present invention.
Figure 32A:
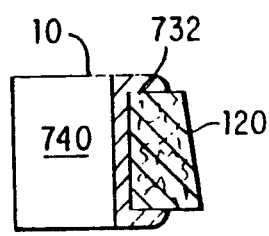
FIG. 32A is a radial cross-section of the bearing of FIG. 32.

FIGS. 32 and 32A illustrate another dovetail journal bearing construction in accordance with the present invention. This bearing construction differs from the previously described bearing constructions in that the carrier 10 is defined by relatively large grooves and openings formed in a "cylindrical blank." Normally, this type of construction would be formed by milling the blank rather than electrical discharge machining or some other similar technique for forming small grooves as with the previously described embodiments. An advantage of the carrier construction illustrated in FIG. 32 is that in applications requiring extremely small bearings it is easier to form precisely the proportionately larger cuts and openings required to form a carrier of the type illustrated in FIGS. 32 and 32A as compared to the proportionately smaller cuts and openings required by the construction of, for example, FIGS. 31 and 31A. Moreover, the large grooves or openings are generally easier to mold or extrude carriers formed by larger cuts also find use in applications requiring extremely large bearings with stiff bearing pad support structures.

The bearing pads 20 shown in FIG. 32 are supported symmetrically about the major axis 706. Hence, the bearing is bidirectional. Moreover, the carrier has a continuous cross-section with no hidden openings. Hence, it is easily extrudable and easily moldable. Naturally, the carrier can be altered by providing discontinuities in the cross-section, e.g., by providing radially extending circumferential grooves or nonsymmetrically disposed radially extending openings to alter the support structure and thereby alter the performance characteristics.

As shown in FIG. 32, the bearing includes a plurality of circumferentially spaced bearing pad support surfaces 732. Each bearing pad support surface 732 is supported by a support structure which includes a pair of generally radial beams 740 connected to the bearing pad support surface 732. A second, generally circumferentially extending, beam 742 supports each of the beams 740. Beams 742 are connected to the housing or tertiary support stubs 744 in a cantilever type fashion. Like the bearing of FIGS. 31 and 31A a plain dovetail bearing pad 120 is shown. Of course any type of bearing pad can be used. However, to maintain the bidirectionality of the bearing the pad 120 should be bidirectional.

FIG. 32A is a radial cross-section of a portion of the bearing illustrated in FIG. 32. In this cross-section, the bearing pad 120, bearing pad support surface 732 and first beam 740 are visible.

Figure 33:
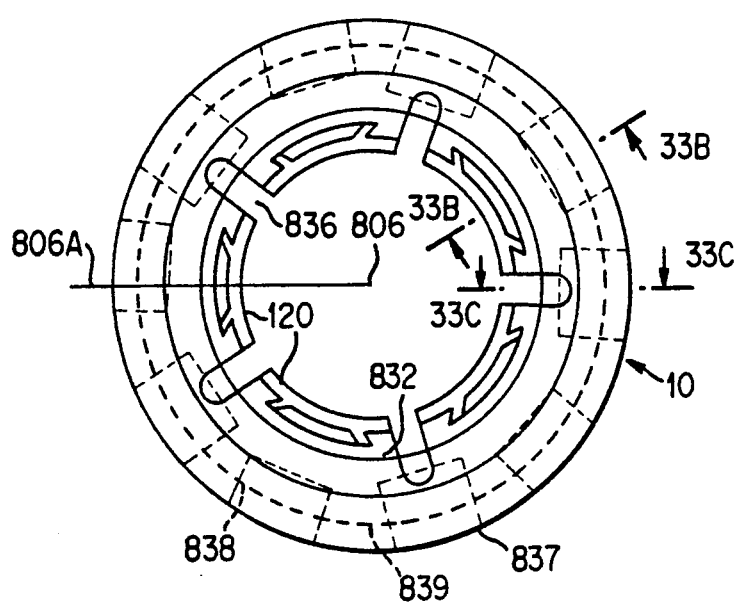
FIG. 33 is a side view of another dovetail journal bearing construction in accordance with the present invention.

FIG. 33 illustrates a dovetail journal bearing construction according to the present invention. Like the bearing of FIG. 32, the carrier 10 of the bearing of FIG. 33 is formed by proportionately large grooves and bores. In particular, a plurality of equally spaced radially extending circumferential grooves define a plurality of circumferentially spaced bearing pad support surfaces 832. The bearing support surfaces 832 are further defined by a pair of axially extending circumferential grooves which extend symmetrically from the planar faces of the cylindrical blank and are best seen in FIGS. 33B and 33C in which the grooves are indicated by the reference numerals 834 and 835. The carrier support structure is defined by the aforementioned structural features and by a plurality of circumferentially spaced symmetrically disposed shallow bores 838 and a plurality of circumferentially spaced symmetrically disposed deep bores 837. Because of the presence of the "hidden" bores 837, 838, the carrier construction of FIG. 33 is not extrudable and not moldable in a simple two-piece mold, i.e., easily moldable.

As best shown in FIG. 33A, the deep bores 837 intersect the axial grooves 836 so as to define support structures for each bearing pad. The support structure is further defined by a circumferential groove 839 extending from the outer periphery of the cylindrical blank.

With reference to FIGS. 33-33C, it will be understood that the provision of the structural members as discussed above provides a support structure for the bearing pad support surface 832 which includes a beam 840 directly supporting the pad, i.e., a primary support structure. Two continuous beams 882, i.e., a tertiary support structure and a secondary support structure comprising a plurality of beams defined in part by bores 837 and 838 connecting the beam 840 to the continuous beams 882.

Because the support structure of the carrier illustrated in FIGS. 33-33C is nonsymmetrical about the pad center line 806A extending from the major axis 806, it is unidirectional. Further, like the carrier 10 of FIG. 32, this carrier is particularly well suited to applications requiring extremely small bearings since the proportionately larger grooves and bores which define this carrier are more easily manufactured.

The dovetail bearing pads 120 have a support portion defined by two angled legs spaced from one another. Consequently, the central region of the pad 120 is flexibly supported. Of course, other types of dovetail pads can be used.

Figures 34A, 34B:
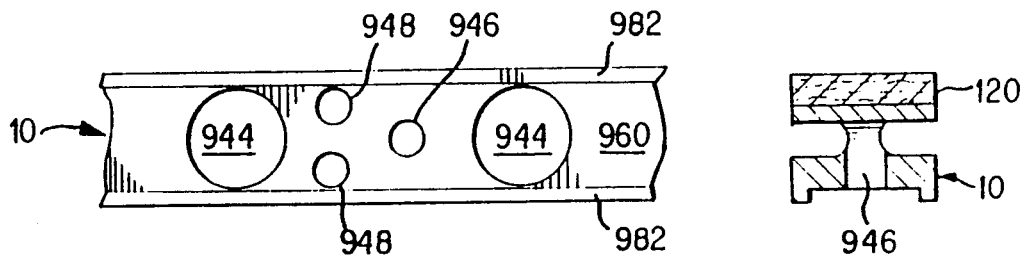
FIG. 34A is a detail view of a portion of the outer periphery of the bearing of FIG. 34.
FIG. 34B is a cross-section of the bearing of FIG. 34.
Figures 34C, 34D:
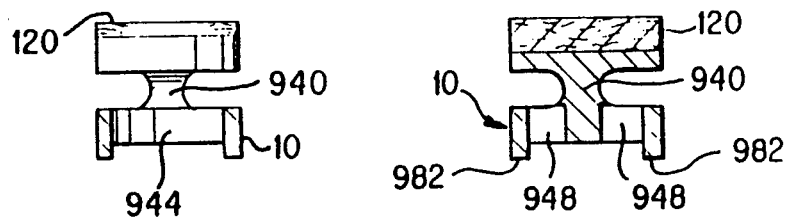
FIG. 34C is another cross-section of the bearing of FIG. 34.
FIG. 34D is another cross-section of the bearing of FIG. 34.

FIGS. 34 and 34A-34D illustrate another dovetail journal bearing construction in accordance with the present invention. The bearing construction of FIG. 34 is similar to that of FIG. 33 insofar as the carriers are defined by proportionately large grooves and bores as shown in the drawings. In particular, while the support structure for each of the bearing pad support surfaces 932 is identical, the support structure is not symmetrical with respect to each bearing pad. Hence, the carrier illustrated in FIG. 34 is unidirectional. Moreover, because the carrier includes "hidden" openings, the carrier is neither extrudable or moldable in a simple two-piece mold.

Again the dovetail bearing pads 120 shown are merely exemplary. In accordance with the modular nature of the present invention, any of the dovetail bearing pads 120 or, with slight modifications, the other bearing pads 20 disclosed herein, may be used.

As shown in the drawings, the carrier includes a primary support structure comprising a pair of beam-like members 940 which are connected to the bearing pad support surfaces 932 and defined in part by symmetrically disposed openings 942. A shallow circumferential groove formed on the outer periphery of the bearing defines a tertiary support structure comprising a pair of continuous beam-like elements 982. A secondary support structure comprising a beam and membrane network 960 for connecting the beams 940 to the continuous beams 982 is defined by the provision of a plurality of large symmetrically disposed bores 944, the provision of smaller symmetrically disposed bores 946 and the provision of small non-symmetrically disposed bores 948. By virtue of the provision of the non-symmetrically disposed bores 948, the support structure is more flexible, and thus biased, in the direction of those bores.

Figure 35:
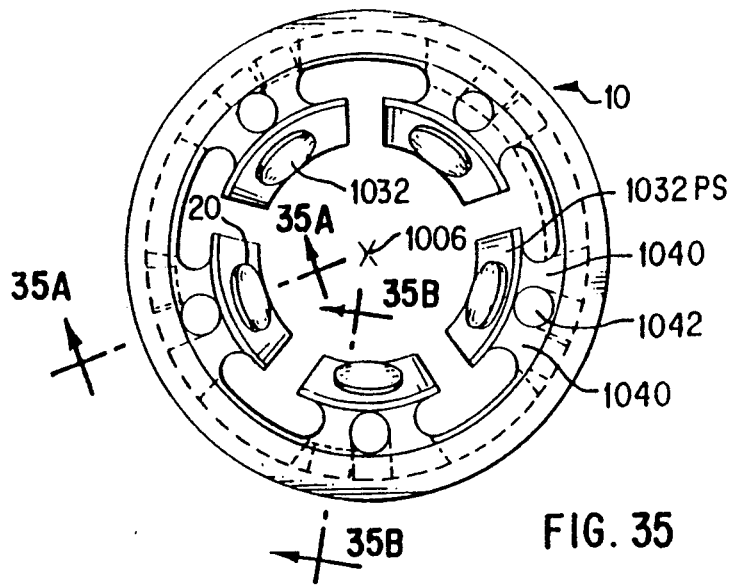
FIG. 35 is a side view of a bearing having combined radial and thrust carrier according to the present invention.
Figures 35A, 35B:
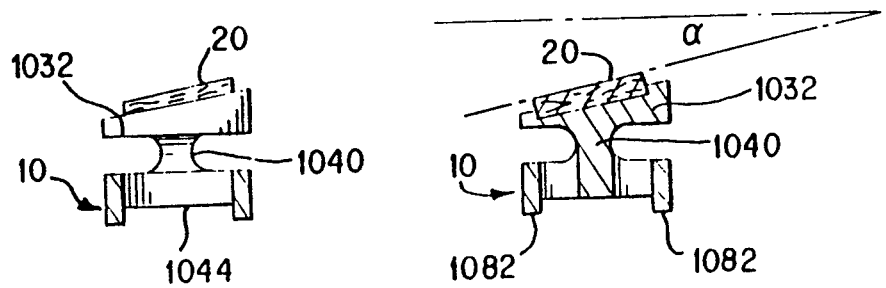
FIG. 35A is a cross-section of the bearing of FIG. 35.
FIG. 35B is another cross-section of the bearing of FIG. 35.

FIG. 35 illustrates a combined thrust and radial hydrodynamic bearing in accordance with the present invention. The bearing illustrated in FIG. 35 is quite similar to the bearing illustrated in FIG. 34 and similar numerals are used to designate similar structure. However, the radial-thrust bearings differ from radial-only bearings in that the bearing pad surface 1032ps is angled with respect to the major axis 1006. By virtue of its angled pad surface, the bearings of FIG. 35 support loads acting both along the major axis 1006 and radially from the axis 1006.

In order to be supported by the angled pad support face 1032ps, the shaft must be fitted with a runner which is angled at a angle complementary to the angle of the pad support face. The portion of the axial load taken by the bearing and the portion of the radial load taken by the bearing depends on the angle of the pad surface 1032ps. If the pad is angled at an angle α with respect to the major axis 1006, the axial load applied to the bearing can be determined by the following equation:

Applied Axial Load = Total Axial Load (Sin α).

Similarly, the radial load applied to the bearing can be determined by the following equation:

Applied Radial Load = Total Radial Load (Cos α).

The carrier support structure for the bearing shown in FIG. 35 is similar to the support structure for the bearing shown in FIG. 34.

FIGS. 17A-17C and FIGS. 18A-18B illustrate various forms of a multimode bearing construction according to the present invention. Multimode bearing constructions are useful in applications involving discrete, widely varying, operating modes. For instance, an application in which a shaft sometimes rotates at a low speed and sometimes rotates at a much higher speed or an application in which the shaft is sometimes heavily loaded and othertimes lightly loaded. When the modes of operation vary widely, it is sometimes difficult to design a single bearing capable of performing optimally under each set of operating conditions. The multimode bearing construction solves this problem by providing separate sets of bearing pads for each mode of operation. Each set of bearing pads is circumferentially spaced about the carrier and is capable of supporting the shaft by itself under one set of operating conditions. Under operating conditions other than those for which they are designed, each set of pads provides little or no support and the shaft is supported by another set of pads. In theory a bearing could, in this way, be designed to include any number of discrete bearing pad sets to support a shaft optimally under many distinct operating conditions. In practice, however, it is difficult to design the bearing to include more than about four such sets of bearings.

Generally, the multimode mode bearing construction is the same as the single mode construction described elsewhere in this application except that the multimode mode bearing includes two or more distinct types of bearing pads and a selective support construction for causing each set of pads to support the shaft during the operating mode for which they are designed but to provide little or no support in other operating modes. One type of selective support construction is based on the principle of load differentiation. Another type of selective support construction involves the use of actively controllable "smart" materials such as piezoelectric quartz or polymers.

Load differentiation is made possible by the fact that any two modes of operation which are sufficiently distinct to require a multimode bearing will necessarily involve distinct pad loading, i.e., one mode will involve relatively high load and the other mode will involve relatively low load. The multimode bearings of the present invention are designed such that the set of pads designed to support the shaft in the low load mode are slightly closer to the shaft portion to be supported than the set of pads designed for supporting the shaft in the high load mode. Thus, under low load operating conditions, only the set of pads designed for supporting the shaft under such conditions operate to support the shaft. The low load pads are designed or mounted on a support which is designed to deflect away from the shaft portion to be supported under high load conditions. Thus, under high load conditions, the low load pads are pushed away from the shaft portion to be supported and the shaft is supported by the high load pads while the low load pads, in their deflected position, provide little or no support.

Load differentiation can be provided in at least two ways. First, the support structure of the pads themselves may be designed such that the pads deflect away from the shaft in response to loads greater than the load for which they are designed. Alternatively or in addition, the carrier portions which support the low load pads may be designed to deflect away from the shaft in response to high loads.

Figure 17A:
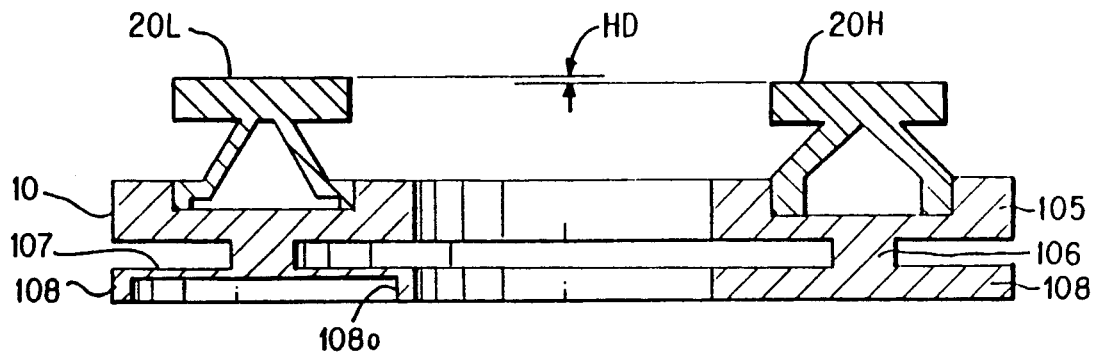
FIG. 17A is a cross-section of a multi-mode bearing according to the present invention.
Figure 17B:
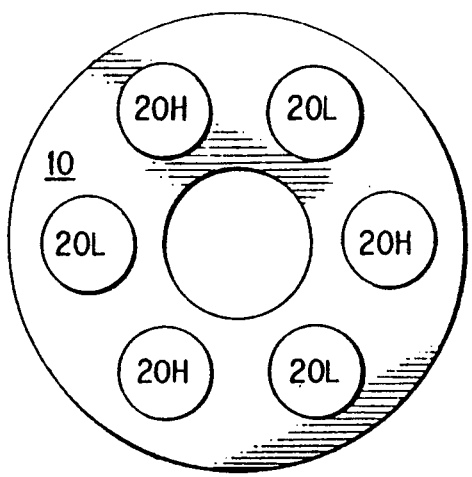
FIG. 17B is a top view of the multi-mode bearing of FIG. 17A.
Figure 17C:
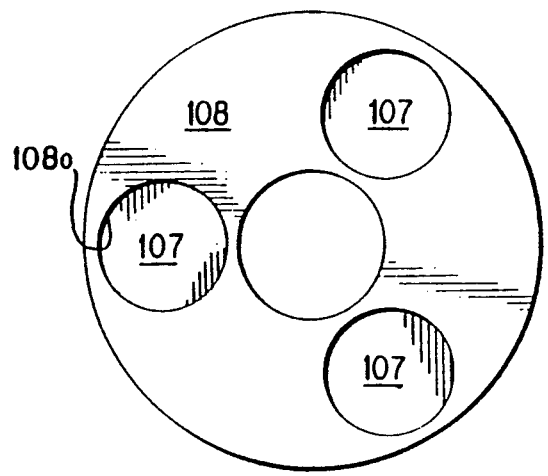
FIG. 17C is a bottom view of the multi-mode bearing of FIG. 17A.

FIGS. 17A-17C show a multimode bearing construction which includes two types of bearing pads 20L and 20H. The first type of bearing pad 20L is relatively flexible and is thus designed to support the shaft in a relatively low load operating mode. The second type of bearing pad 20H is relatively rigid and is thus designed to support the shaft in a relatively high load operating mode.

In the specific illustrated example, the low load bearing is similar to that shown in FIGS. 3E and 3F and discussed above and the high load bearing is similar to that shown in FIGS. 3C and 3D, also discussed above. Of course, other types of bearing pads could be used. In the bearing of 17A-17C, load differentiation primarily occurs through the design of the carrier 10 member.

More specifically, the carrier is designed such that each set of pads (the high load pads and the low load pads) are supported on a pad support portion 105 which is supported on a continuous circumferential ring portion 106. For the high load pads 20H the continuous circumferential portion 106 is supported on a solid base 108. However, for the low load pads 20L the solid base 108 is provided with an opening 108o such that the continuous beam 106 rests on a very thin membrane 107. By virtue of this construction, the low load pads 20L are supported on a portion of the carrier 10 which has much greater flexibility in the vertical direction as viewed in FIG. 17A than the high load pads 20H. Thus, in response to high loads applied to the low load pads 20L, the support for these pads would deflect vertically downward such that the pad surface of the low load pads 20L would deflect away from the surface to be supported. On the other hand, the carrier support for the high load pads 20H is relatively rigid and would not deflect in this manner. Hence, in response to high loads, substantially all of the support is provided by the high load pads 20H.

On the other hand, in order to ensure that the low load pads 20L provide substantially all of the support under low load conditions, the bearings are arranged such that the low load pads 20L have a pad surface which is mounted slightly higher than the pad surface of the high load pads 20H. This height difference is indicated as HD in FIG. 17A. The height difference may be provided by either providing a deeper mounting bore in the carrier 10 for the high loads pads 20H or making the low load pads 20L somewhat taller. As a consequence of this height difference (HD) the surface of the low load pads contacts the surface to be supported before the surface of the high load pads 20H. Depending on the design conditions, the bearing pads and carrier support structure are designed such that, in the low-load mode, the low load pads 20L sufficiently support the entire load.

FIG. 17B illustrates the circumferential arrangement of high load pads and low load pads around the carrier 10. As illustrated therein, each set of pads i.e. the high load pad set and the low load pad set are circumferentially spaced about the major axis of the bearing. This is necessary to ensure that each set of bearing pads is capable of independently supporting the shaft portion to be supported. Additional sets of bearing pads can be provided to support the shaft in intermediate load conditions. The primary limitation on the number of such additional sets of bearing pads which can be provided is the need to provide an adequate number of bearing pads in each set to independently support the shaft and the practical necessity of keeping the bearing pad and overall bearing size reasonable. Also, the operating modes must be sufficiently distinct to allow load differentiation.

FIG. 17C shows the location of the bores 108 formed in the bottom of the carrier to form the thin membrane supports 107 under the locations of the low load pads 20L.

Figure 18A:
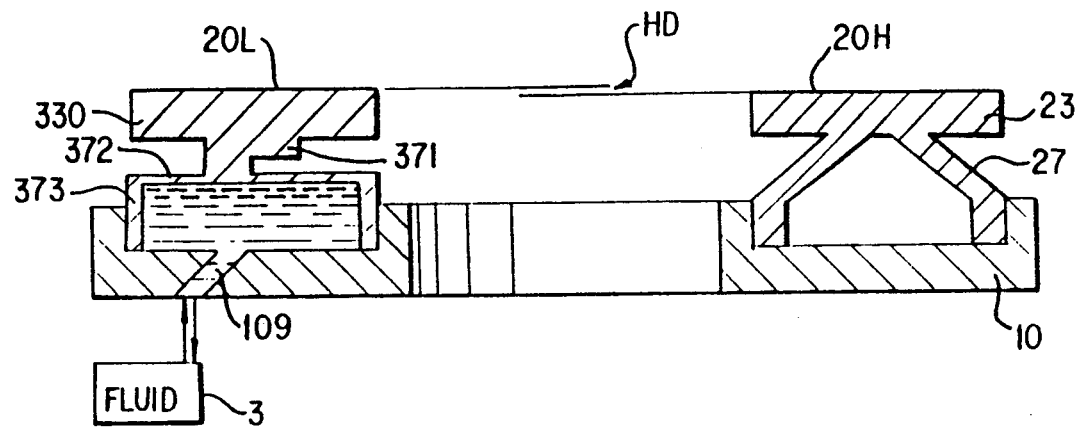
FIG. 18A is a cross-section of another multi-mode bearing according to the present invention.
Figure 18B:
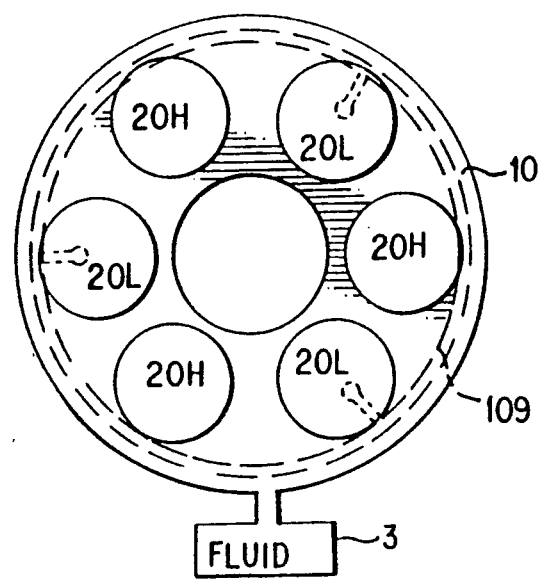
FIG. 18B is top view of the bearing of FIG. 18A with hidden fluid passages shown in phantom.

FIGS. 18A and 18B illustrate an alternative construction in which load differentiation occurs as a result of the bearing pad construction. Specifically, the bearing construction includes two types of bearing pads 20L and 20H. The first type of bearing pad 20L is relatively flexible and is thus designed to support the shaft in a relatively low load operating mode. The second type of bearing pad 20H is relatively rigid and is thus designed to support the shaft in a relatively high load operating mode. In the illustrated embodiment, the high load pad set 20H is of the type illustrated in FIGS. 3C and 3D, discussed above, and the low load pad set 20L is generally similar to that illustrated in FIGS. 4B and 4C, also discussed above. Naturally, other forms of the bearing pads can be used as desired.

The carrier 10 can be a conventional carrier which provides essentially the same support for each type of bearing pad 20L, 20H. The passage 109 formed in the carrier 10 is for a particular purpose, described below, and is not for load differentiation. The bearing pad 20L is somewhat taller than the bearing pad 20H so as to provide a height difference (HD) in the assembled state as shown in FIG. 18A. In order to achieve load differentiation, the low load pad set 20L is designed so that under high load conditions, it deflects away from the shaft surface and the high load pad 20H provides most of the support necessary. To this end, the low load pad 20L has an extremely flexible support structure which includes a cylindrical primary support portion 371, a thin membrane secondary support portion 372 and cylindrical leg-like tertiary support portion 373. Naturally, this is just one example of an extremely flexible bearing pad construction. Any pad such as the flexible bearing pad constructions disclosed herein could be employed.

By virtue of the construction illustrated in FIGS. 18A and 18B, under low load conditions, the surface of the low load pads 20L first contact the shaft portion to be supported. The support structure of these bearing pads 20L are designed to adequately support the shaft under these low load operating conditions. Under higher loads, the low load pad 20L deflects away and the high load pad 20H provides most of the support for the shaft.

FIGS. 18A-18B also illustrate the possibility of providing variable stiffness to a bearing pad, in this example, the low load pad 20L. Specifically, when the bearing pad 20L is mounted in the carrier 10, an enclosed chamber 373C is formed between the inside walls of support portions 372 and 373 and the bottom of the mounting bore. This chamber may be selectively provided with fluid from a fluid source 3 through a series of passages 109 such that the stiffness of the bearing can be varied. Specifically, when the chamber 373C is completely filled with pressurized fluid, the thin membrane 372 is rigidly supported such that the bearing pad 20L is much more rigidly supported. On the other hand, when fluid is evacuated from the chamber 373, the membrane 372 is free to deflect so that the bearing pad 20L is lightly supported.

In accordance with yet another aspect of the present invention, the fluid enclosed within the chamber may be an electrorheological (ER) fluid. ER fluids change viscosity in the presence of electric fields such that they can change rapidly from free flowing liquids into a high viscous, virtually solid form depending on the strength of the electrical field. When the chamber 373 is filled with an ER fluid, it is possible to provide almost continuous variation in the rigidity of the support for the thin membrane 372. In this way, the rigidity of the bearing pad 20L can be varied from anywhere between the flexible dampened support provided when the ER fluid is free flowing to the extremely rigid support when the ER fluid is highly charged and functions as a solid.

As noted above, a second type of selective support construction is based on the principle of constructing the bearing as a smart structure. Smart structures are structures which are capable of sensing environmental conditions and changing in their characteristics in response thereto. Generally, smart structures combine three types of components: a skeletal support component; a sensor component and an actuator component. The functions of each of these components are comparable to biological functions. The structural or skeletal support component functions as the framework or skeleton of the bearing and is generally formed of structural materials such as aluminium, steel, bronze, ceramics, plastics or light weight composites. The sensor component functions like the sensory nervous system and it is formed of materials tailor-made to sense and monitor changes in temperature, pressure or other physical conditions indicative of proper bearing support. Finally, the actuator component functions like the muscle system expanding, contracting or undergoing some other physical change to physically alter the skeletal support system. The smart bearing constructions of the present invention have structural components which are essentially similar to the bearing pads described heretofore. The sensor component can be conventional electronic sensors or a smart material which is physically altered by changed conditions. Similarly, the actuator component can be conventional mechanical or electric actuators or smart materials whose physical properties can be selectively altered. Piezoelectric materials are suitable as both an actuator and a sensor material. In particular, piezoelectric materials such as quartz and certain polymers generate an electric voltage when pressure is applied to them; conversely, they expand or contract when exposed to an electric field. Thus, pressure applied to piezoelectric sensors in a bearing pad will produce a voltage which can be used to signal actuators to pass a current through other piezoelectric materials in the actuator component to stiffen up or soften the structure.

Another suitable material for both the sensor and actuator component of "smart" structures is TERFENOL. TERFENOL is a new group of magnetostrictive rare earth alloys, of Iron, Terbium and Dysprosium, that produce giant dimensional changes when exposed to a magnetic field. TERFENOL has the largest magnetostriction of any material and requires only modest magnetic fields of 500-1000 Oe depending on the amount of pre-stressing used. In microseconds, the length of a 100 mm rod grows by 0.2 mm. Such changes are 100 times greater than earlier magnetostrictive and up to 20 times greater than piezoelectric materials. TERFENOL is current driven and operates at low voltages as contrasted to electrostrictive materials that are subject to undesirable arcing.

TERFENOL changes its shape due to atomic forces and it can work into mechanical impedances of 200 MPa (29,000 psi) with strains of 2000 ppm. TERFENOL is superior to all other materials in generating mechanical energy at low frequencies of 0-5 kHz. For higher frequencies of up to 20 kHz eddy current losses have to be considered and lamination is required. It transmits extraordinary amounts of energy per unit volume (30,000 J/m3). The conversion of electrical to mechanical energy occurs efficiently with magnetoelastic coupling factors greater than 0.7.

The permeability of the material is low (5-10). The relative permeability changes with mechanical stress, which means that TERFENOL can also be used as a sensor with exceedingly fast response time, since it produces electrical energy when a mechanical force is applied. Other amorphous magnetoelastic materials (iron silicon boron) are now available for sensing applications with gauge factors up to 500,000 and magnetoelastic coupling coefficients as high as 0.98.

TERFENOL has a high bandwidth of 0-15 kHz for a 100 mm rod. It operates well at low frequencies and is ideal for sonic frequencies below 1 kHz. This means that the signal goes further and generates higher resolution on the return. The Young's modulus, the resonant frequency and the sound speed of the material can be the resonant frequency and the sound speed of the material can be controlled over a wide range, using a magnetic bias field. The Young's modulus reaches twice its original value when the material is saturated.

Figure 19B:
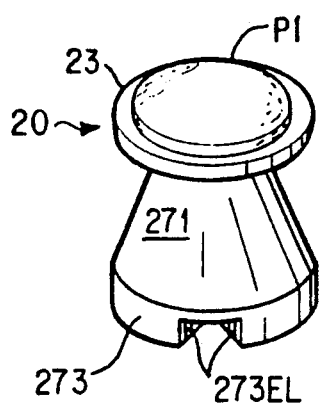
FIG. 19B is a perspective view of a bearing pad with built-in electrical leads which is adapted to be mounted in the carrier of FIG. 19A.
Figure 19A:
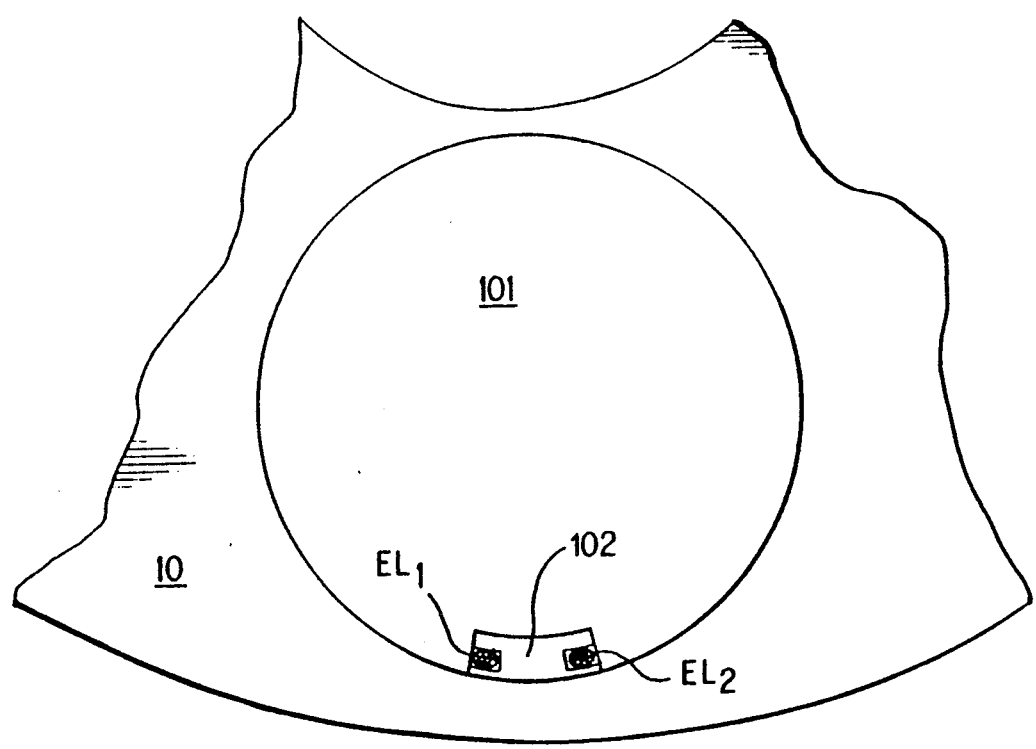
FIG. 19A is a top detail view of a portion of a carrier which includes a locating protrusion with built-in electrical leads.
Figure 19C:
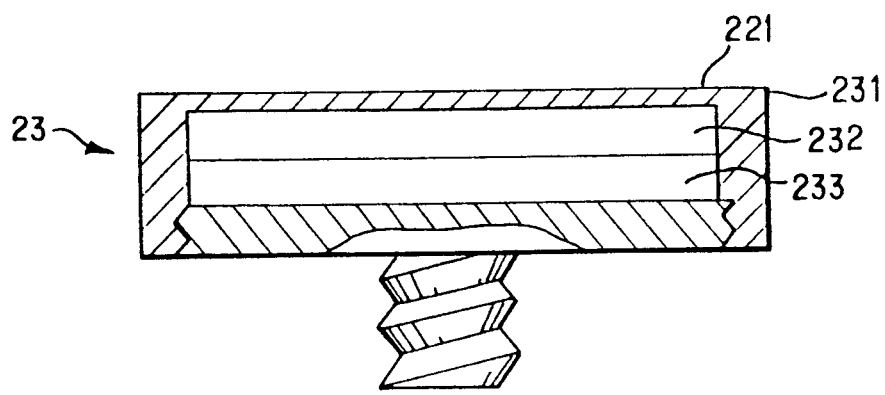
FIG. 19C is a side cross-section of a smart bearing pad intended for use in a modular bearing pad.

A simple construction illustrated somewhat schematically in FIG. 19C is a "smart" bearing pad. The smart bearing pad includes a sensor and actuator, both made of piezoelectric material such that as pressure is applied to the bearing pad, a voltage is fed into a feedback amplifier (not shown). The feedback amplifier processes the pulse and sends a voltage to the actuator causing it to expand or contract as necessary to relieve the pressure. Eventually, a desired equilibrium state, which according to design corresponds to optimum wedge formation, is achieved.

Other types of smart structures are contemplated. For instance, the sensor component can be a discrete physical sensor which senses temperature, pressure, energy consumption, power loss, friction or any other conditions which are indicative of wedge quality. These sensed conditions could be fed into a central processing unit (CPU) which would then provide a signal to the actuator which could include a piezoelectric material, TERFENOL, an ER fluid a shape-memory metal such as nitinol (a nickel-titanium alloy) or, some other smart material or a mechanical actuator for altering the characteristics of the bearing.

Naturally, smart bearing constructions can be used in a wide variety of applications requiring precise control. When, as suggested above, a smart bearing is to be used to provide a selective support construction for a multi-mode bearing, the actively controllable elements are arranged such that distinct sets of bearing pads can be selectively activated and deactivated. For example, the pads can be mounted on a piezoelectric element or some mechanical actuator so that they can be "raised" to a support position for supporting the shaft in the mode for which they are designed and "lowered" during other modes of shaft rotation. Alternatively, the pads can be designed to stiffen to support the shaft for rotation in the mode for which they are designed and soften to provide little or no support during other modes of operation.

There are, of course, other uses for actively controllable bearing constructions. For instance, the bearings of the present invention can be adjusted in response to sensed operating conditions to correct any operating deficiencies. More specifically, the bearings of the present invention can include separate elements for physically altering the wedge shape, pad surface and/or deflection characteristics of the support structure. The separate elements can be controlled by a central processing unit (CPU) which in turn receives signals indicative of wedge quality. For example, the sensors can sense physical characteristics such as temperature, shaft to pad contact, torque, noise, power consumption, etc. The signals from the sensors are transmitted to the CPU and compared with conditions indicative of optimum wedge formation. When there is a substantial deviation between the actual sensed conditions and the conditions indicative of optimum wedge quality, the CPU transmits a signal to the means for physically adjusting the wedge shape, pad surface and/or deflection characteristics of the pad or carrier support structure to forcibly adjust the wedge to achieve optimum wedge formation. Alternatively, or in addition, the CPU can be responsive to direct, manually input, commands such as "INCREASE RIGIDITY" or "RAISE TRAILING EDGE". When such a command is received, the CPU undergoes a routine predetermined to achieve the desired result.

Various means can be used to physically alter wedge quality. For example, wedge quality can be physically altered by forcing hydraulic fluid into damping chambers (discussed below) to alter the damping characteristics of the bearing support structure. Alternatively, a mechanical rod or jack screw can be brought into contact with the support structure to physically alter the deflection characteristics of the support screw. Either of these means could be electrically controlled.

Although many means could be used to physically adjust the wedge in response to sensed operating conditions, it is presently believed that the best such means is to provide one or more piezoelectric elements in the interstices within the bearing support structure or between the support structure and the bearing pad. The provision of piezoelectric elements in this matter makes it possible to actively control or adjust pad shape and orientation and to affect the deflection characteristics of the support structure. Of course, similar results can be obtained through the use of elements formed of magnetostrictive rare earth alloys such as TERFENOL or pockets of ER fluid. Thus, while the following discussion specifically refers to piezoelectric elements, it is to be understood that other smart materials can be used in essentially the same manner. As noted above, it is known that the application of an electric current to certain crystals and ceramics materials can produce mechanical expansion forces. When an altering voltage is applied, the crystal or ceramic material undergoes thickness oscillations. However, when a direct current is constantly applied the change in thickness does not vary. Thus, it is known that certain materials can change dimensions when subjected to voltage. Notable among these peizoelectric materials are quartz, various polymers, rochelle salt (potassium, sodium tartarade), properly polarized barium titanade, ammonium dihydrogen phosphate, ordinary sugar and certain ceramics. Of all the materials that exhibit the piezoelectric effect, none possesses all the desirable properties such as stability, high output, insensitivity to temperature extremes and humidity, and the ability to be formed into any desired shape. Rochelle salt provides the highest output, but requires protection from moisture and air and cannot be used above 45° C. (115° F.). Quartz is undoubtedly the most stable, yet its output is low. Because of its stability, quartz is quite commonly used for a stabilizing in electronic oscillators. Often the quartz is shaped into a thin disc with each phase silvered for attachment of electrodes. The thickness of the plate is ground to the dimension that provides a mechanically resonant frequency corresponding to the desired electrical frequency. This crystal may then be incorporated in an appropriate electronic circuit with frequency controls. For use in bearings, polymeric and ceramic piezoelectric materials appear to be most suitable.

The piezoelectric elements could be located in the interstices of the bearing pads and or carriers of any of the hydrodynamic bearings of the present invention. However, the convenience of placing a piezoelectric element within the support structure or within a spring mounted carrier or between the support structure and the bearing pad naturally depends on the spacing between the support structure and the bearing pad or within the support structure. Since the bearings described herein have a wide variety of intersticial spacing and because the actual size of the spacing depends on the size of the bearing, the selection of a bearing pad or carrier form from the varieties described hereinafter for use in a piezoelectrically controlled bearing depends on, among other things, the diameter of the bearing to be used.

For a relatively large bearing in which the openings in the carrier or pad support structure are proportionately larger, a bearing having relatively small openings would be appropriate. On the other hand, for very small carriers or bearing pads in which the interstices or spaces are proportionately much smaller a bearing with relatively large openings would be more appropriate. It should be kept in mind that when the size of the piezoelectric element becomes close to the size of the support structure elements themselves, the effect of the piezoelectric element on the overall bearing construction becomes proportionately greater. Under normal circumstances, the piezoelectric elements are intended only to provide small modifications to the bearing performance, since the bearings even without the piezoelectric element function, close to optimally. Thus, the provision of a piezoelectric element filling the space within the support structure of the carrier of FIG. 32 would alter the essential character of the bearing from a hydrodynamic bearing to a piezoelectrically controlled bearing. In some cases this may be desired.

For example, the bearing shown in FIGS. 25 and 31 can include piezoelectric elements 100 disposed within the carrier support structure and between support structure and the bearing pads. Electrical leads (not shown) are connected to each of the piezoelectrical elements. The supply of current to the electrical leads is controlled by a control system. Preferably, the control system includes a central processing unit (CPU) which controls all of the piezoelectric elements in response to signals obtained from sensors monitoring the condition of the hydrodynamic wedge or in response to manually input signals.

One example of a control system controlling the piezoelectric elements 100 in the bearings of the present invention includes a CPU which receives input signals from various sensors which monitor conditions indicative of the quality of the hydrodynamic wedge. For example, the CPU could receive signals from a temperature sensor, a noise sensor, a shaft to pad contact sensor, power consumption sensor, torque sensors and/or strain sensors. The signals received from each of these sensors can then be sequentially compared to values stored in a read-only memory (ROM) which are indicative of proper wedge formation. The ROM could include stored values for one or more desired wedge formations such as "MAXIMUM LOAD CARRYING ABILITY" or "LOW FRICTION/LOW POWER". When it is determined that the sensed conditions fall outside of the appropriate range, a diagnostic analysis could be performed to determine the appropriate corrective measure. As a result of this diagnostic analysis, a determination of which, if any, of the piezoelectric elements are to be charged and the extent to which they are to be charged can be made.

As noted above, the bearing of FIG. 25 can include piezoelectric elements 100 located within the carrier structure to allow selective precise control of the amount of downward deflection of the bearing pad support surface 132. In this particular instance, the piezoelectric elements 100 are provided in a common location for each of the bearing pads so that the piezoelectric elements have a single function, i.e., controlling the downward deflection of the bearing pad support surface. Naturally, additional piezoelectric elements 100 could be provided in other locations for other purposes if desired. Again, the piezoelectric elements 100 have leads (not shown) connected thereto and the flow of current to the leads is controlled by a central processing unit of the type described above.

The bearing of FIG. 31 can include piezoelectric elements 100 located in selected areas to allow selective adjustment of the wedge according to sensed operating conditions. Once again, the leads are connected to the piezoelectric elements 100 and the flow of current to the piezoelectric elements through the electrical leads is controlled by a control system which may be of the type described above. It should also be noted that the flow of current to the piezoelectric elements can be controlled by a manually operated electrical control system. It is believed however that better results are obtained through the use of a central processing unit.

For purposes of a multimode bearing, smart bearing constructions can be used in two ways. First, the bearings can be designed to include only one set of bearing pads which have "smart" constructions, the deflection characteristics of which can be varied to accommodate the requirements of different operating modes. Alternatively, the actively controllable materials can be used to activate or deactivate selected bearing pad sets by pushing them toward or away from the shaft portion to be supported.

FIG. 19A shows a partial top view of a carrier 10 which has a mounting bore 101 which includes a locating protrusion 102. The locating protrusion 102 includes two electrical leads $EL_1$ and $EL_2$. Such a carrier member could be used in a smart system requiring electrical leads fed into the bearing pad or support structure for the purpose of carrying charge to or from a piezoelectric material, a ER fluid, a shape memory metal or some other smart material.

FIG. 19B shows an example of a bearing pad 20 which can be used in such a carrier. Specifically, the bearing pad 20 is similar to the bearing pad shown in FIGS. 3C and 3D and discussed above. However, the pad portion 23 includes a pad insert PI which provides the actual pad operating surface. Additionally, a notch is formed in the dog-leg or tertiary support portion 373 to allow mounting of the bearing pad 20 in the carrier 10. Electrical leads 273EL are formed adjacent to the notch so as to provide electrical contact with the leads $EL_1$ and $EL_2$ when the bearing pad 20 is mounted in the carrier 10 of FIG. 19A. If, as shown, the smart material is used in the bearing pad portion 23, the electrical leads 273 EL would extend to the pad insert PI. Of course, smart materials could be provided in the support structure rather than in the pad surface. If so, the electrical leads would provide current to such locations.

The pad insert PI shown in FIG. 19B could be a piezoelectric material or a composite which included some type of piezoelectric material such that when current is supplied to the pad insert, the shape of the pad insert would change to adjust wedge formation.

Figure 19E:
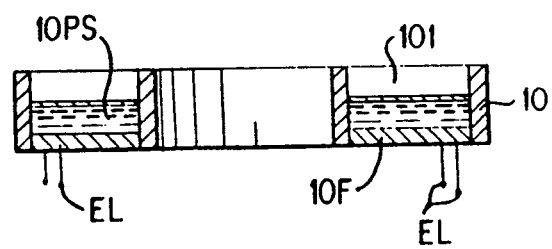
FIG. 19E is a cross-section of a carrier having adjustable rigidity according to the present invention.
Figure 19D:
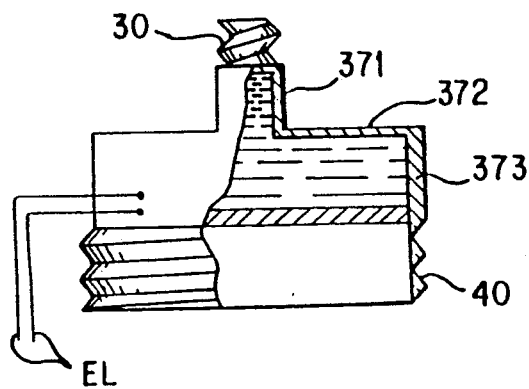
FIG. 19D is a side view partially cut away of a support structure having adjustable rigidity according to the present invention.

FIG. 19D illustrates a modular support structure component having an adjustable rigidity. Specifically, the skeletal portion of the support structure includes a thin tubular primary support portion 371, a thin membrane secondary support portion 372 and a circumferential beam-like tertiary support portion 373. Connector portions 30 and 40 are formed at either end of the support structure to allow it to be received in a carrier (via threads 40) and to receive a bearing pad portion via threads 30.

Because of the relative thinness of the skeletal portion 371, 372 the structure would be quite flexible. However, the interior of the support structure is fluid tight and sealed to include an ER fluid. Electrical leads EL are provided to selectively provide variable amounts of current into the ER fluid such that the rigidity of the support structure can be selectively varied from a very flexible support structure to an extremely rigid support structure. The control of the supply of current could be in response to sensors (not shown) which sense selected conditions which are indicative of wedge quality.

FIG. 19E shows a smart carrier construction 10. The carrier 10 includes a plurality of pad mounting bores 101. The support for each pad mounting bore 101 is a thin pad support surface 10PS. Immediately below each pad support surface 10PS is a fluid tight chamber filled with ER fluid 10F. Electrical leads EL are provided to allow the provision of current to the fluid filled chambers. In the manner described above, current can be provided to selectively vary the rigidity of the pad support surface 10PS from a very flexible surface to an extremely rigid surface. Again, the supply of current can be controlled in response to sensors which sense physical conditions indicative of wedge quality.

Figure 19F:
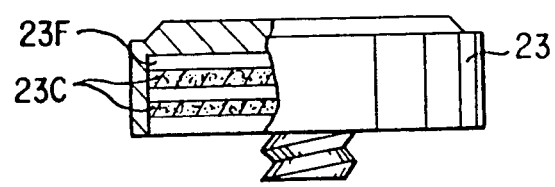
FIG. 19F is a side view, partially in section of a bearing pad having adjustable rigidity according to the present invention.

FIG. 19F illustrates a smart bearing pad according to the present invention. The bearing pad includes a skeletal portion which includes a screw like projection to enable mounting in a support structure in accordance with the modular construction of the present invention. Additionally, as shown in the cut away portion of FIG. 19F the bearing pad includes alternating layers of ER fluid 23F and a composite material. When subjected to electrical voltages, the particles in the ER fluid are realigned, making the fluid nearly stiff as a solid. When the layers are controlled by a feed-back system, it is possible to fine tune the stiffness of the bearing pad in response to sensed conditions indicative of wedge quality.

Whenever a bearing employs pre-biased bearing pads, it is critical that the bearing pad be precisely positioned within the carrier to ensure that the bearing pads are properly aligned so that the pads deflect properly under loading. Precise pad positioning is also important in actively controllable bearing constructions because there must be a fixed point of reference from which changes are made.

Figure 6C:
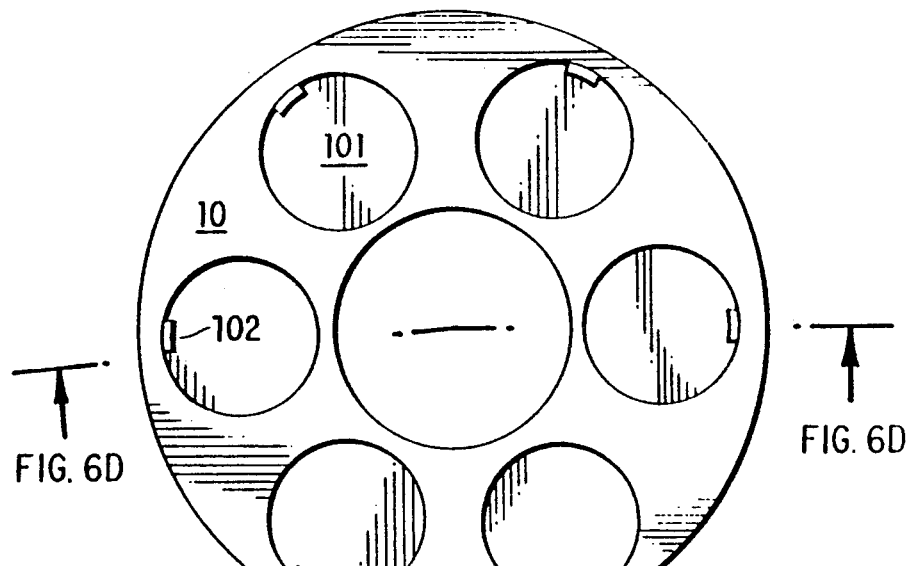
FIG. 6C is a top view of the carrier member of FIG. 6D.
Figure 6D:
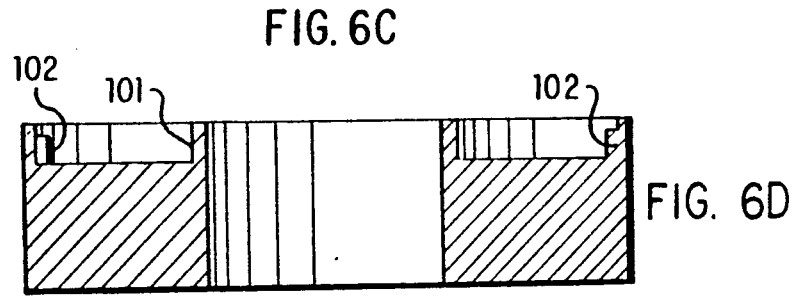
FIG. 6D is a cross-section of another carrier member having a locating protrusion.
Figure 8:
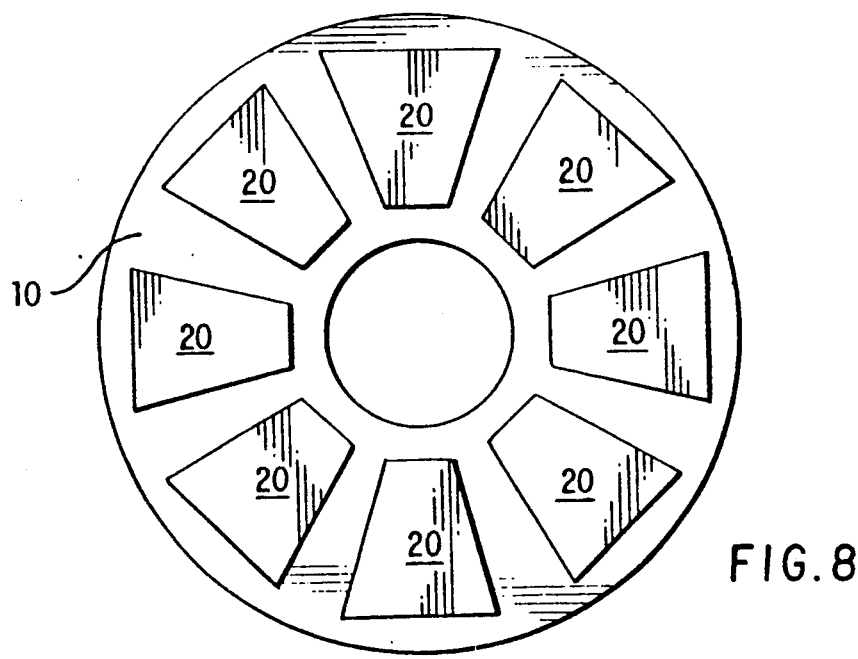
FIG. 8 is a top view of another bearing pad arrangement according to the present invention.

FIGS. 6A, 6B, 6C and 6D illustrate another aspect of the present invention whereby the bearing pads 20 can be precisely located within the carrier 10. In FIGS. 6A and 6B, the carrier 10 is provided with locating pins 102 non-symmetrically disposed within the bores 101 provided for receiving the bearing pads 20. The locator pin 102 can be received in one of the non-symmetrically disposed openings in a bearing pad support structure (or a similar opening provided somewhere else in the bearing pad), to precisely position the bearing pad within the bore in the carrier 10. An alternative construction is illustrated in FIGS. 6C and 6D. In this construction locating protrusions 102 extending from the wall of the bore 101 and used instead of separate locating pins. The locating protrusion can be received in a complementary notch formed in the dog leg or tertiary support portion of any of the bearing pads of the present invention. By virtue of this locking pin or protrusion arrangement, the pre-biased bearing pads are forced into proper alignment when mounted in the bore. It should be understood that when locator posts or protrusions are used, only those connectors which do not require rotation of the bearing pad into the carrier may be used. Thus, while press fitting or the connectors shown in FIGS. 12B and 12C are acceptable, threads are not.

FIGS. 7-10 illustrate the modularity which is obtainable with the bearing construction of the present invention. More specifically, these drawings illustrate a number of the possible bearing configurations which can be achieved by simply using different standard parts. As discussed previously, any standard bearing pad support portion can be combined with any standard bearing pad portion.

In FIG. 7, a number of conventional round bearing pads 20 are circumferentially spaced in a carrier 10. In the past, such round portions have been employed primarily because it is easier to form a round pad portion when the pad portion is machined integrally with the support portion. However, in some cases it might be desirable to use non-circular bearing pads if this can be done without increasing cost. This can be done in accordance with another aspect of the present invention.

When the bearing pad portions are formed separately in accordance with the present invention, manufacturing complexity is not an important concern in choosing a pad shape since any pad shape can be easily manufactured. For instance, by using wedge shaped bearing pads 20 such as those shown in FIG. 8, greater pad surface is provided thereby enhancing shaft support. Thus, it may be desirable to provide a standard wedge shaped bearing pad in addition to the conventional round shaped bearing pad. In addition, although not illustrated as such, it is usually desirable to provide bearing pad portions of a size which, when assembled, provides a nearly continuous bearing pad surface. For instance, the pads can be sized such that the edges of adjacent bearing pads are almost in contact.

Figure 9A:
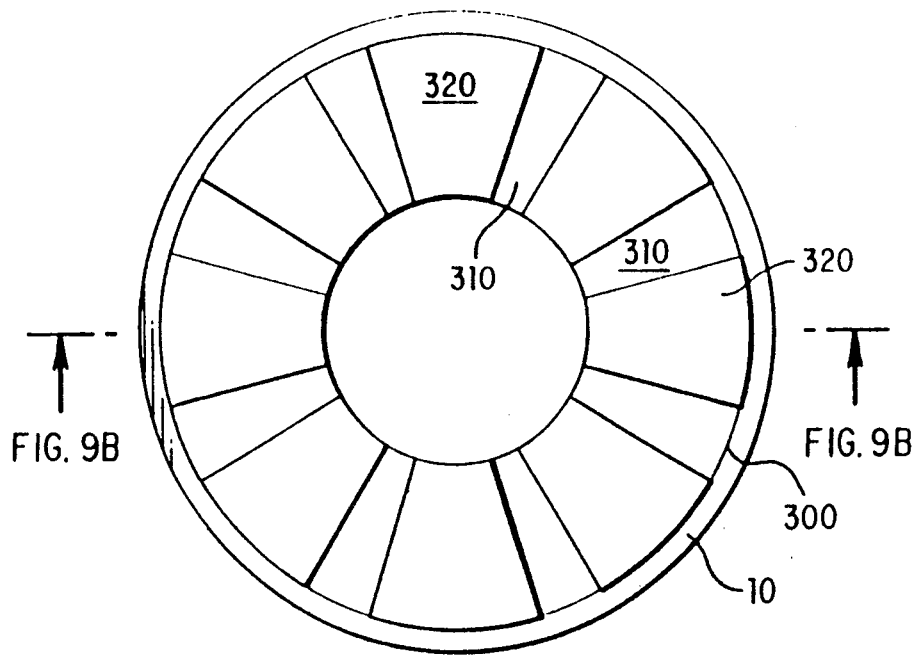
FIG. 9A is a top view of a bearing which includes a unitary bearing pad construction mounted in a carrier.
Figure 9B:
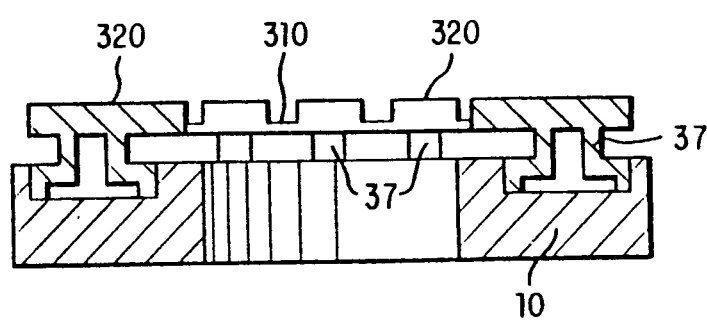
FIG. 9B is a side cross-section of the bearing of FIG. A.

In some instances, it may be desirable to provide a single continuous bearing pad ring rather than a plurality of discrete pads. FIGS. 9A and 9B illustrate one such bearing pad ring which is continuous, but includes a plurality of recessed portions 310 and a plurality of pad portions 320. By virtue of the symmetrical disposition of the recessed portions 310 and the pad portions 320, this bearing functions in many ways like a bearing having discrete bearing pads. Naturally, the continuity of the member 300 affects performance by, for example, giving the support structure increased rigidity and inhibiting deflection of the individual pads. These effects can be minimized by making the recessed portions very thin. Used with a standard carrier and plurality of pad support portions, the continuous member 300 would have a number of pad support receiving members corresponding the number of bearing pad support portions and would be secured to these pad support portions by press or snap fitting or some other means for releasably securing which can accommodate the continuous member. The use of a continuous member is helpful in precisely positioning the bearing pad surfaces and in assuring uniform deflection.

Figure 10A:
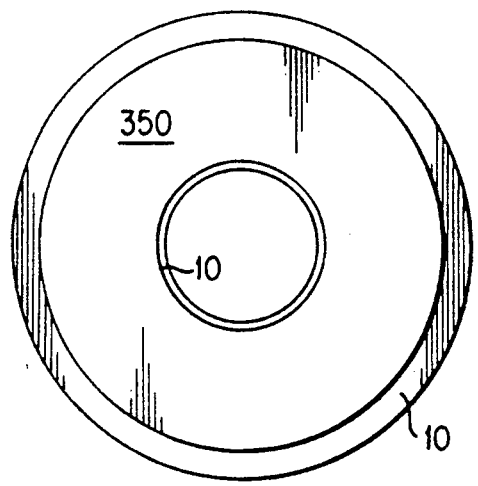
FIG. 10A is a top view of a bearing which includes a continuous bearing ring construction according to the present invention.
Figure 10B:
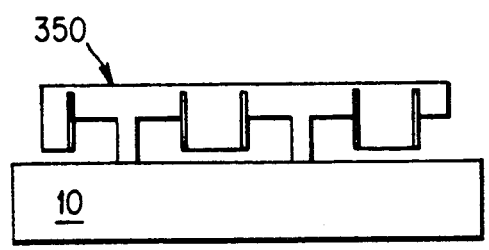
FIG. 10B is a side view of the bearing of FIG. 10A.

FIGS. 10A and 10B illustrate a further embodiment of the continuous bearing ring construction in which the pad surface of the bearing pad portion 350 is smooth. The pad portion and/or support portion must support the bearing pad surface 350 to deform under loading so as to provide hydrodynamic support of a shaft. The plane of the smooth surface should be parallel to the surface of the shaft to be supported in the unloaded condition and deformed under loading to provide a plurality of circumferentially spaced hydrodynamic wedges. As best shown in FIG. 10B this can be done by providing a unitary support structure which includes a repeating series of support sections each section including, in order, a fully rigid portion, an extremely thin connecting portion, a partially rigid portion and another extremely thin connecting portion.

Figure 10C:
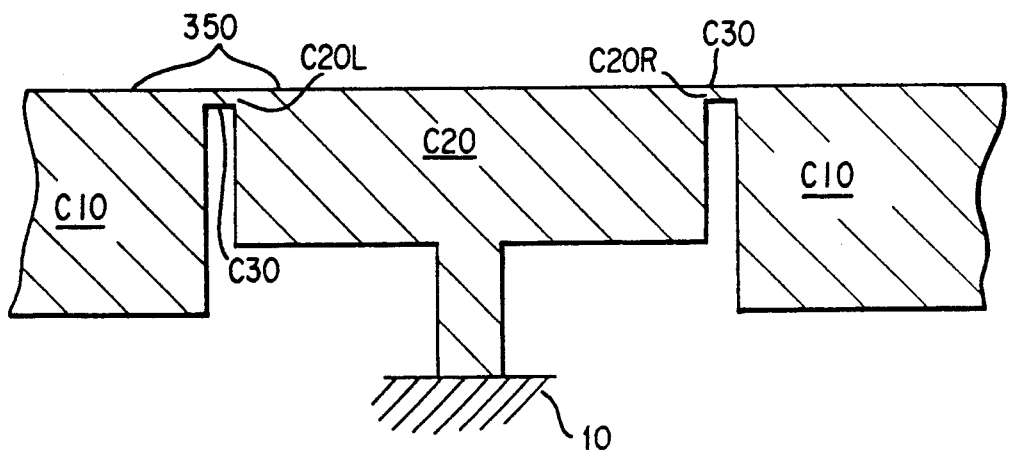
FIG. 10C is a schematic view of the construction of FIG. 10A in an unloaded state.
Figure 10D:
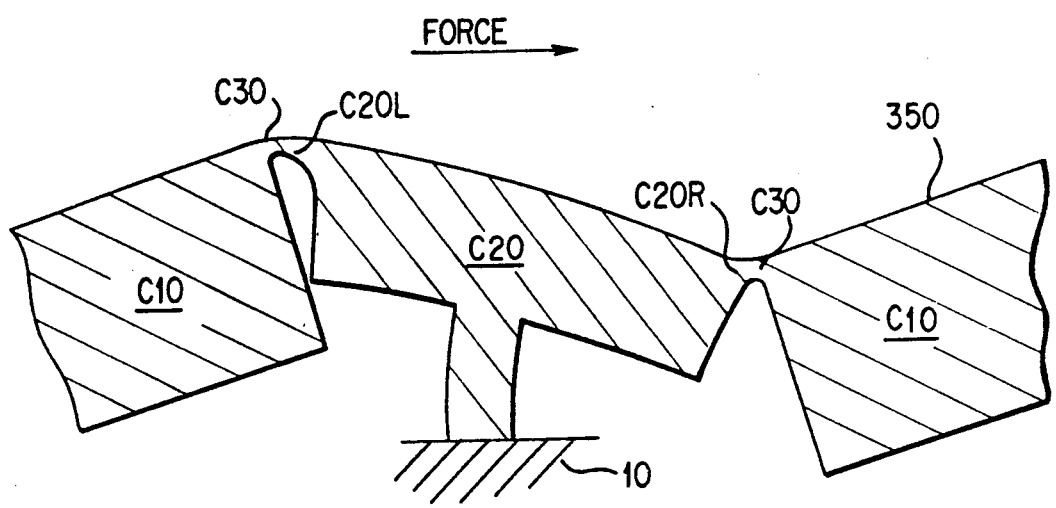
FIG. 10D is a schematic view of the construction of FIG. 10A deflected under load.

FIGS. 10C-10E illustrate the operating principles of the continuous inner diameter bearing. The bearing is based, in principle, on a system which includes a series of fully rigid support blocks C10 which are rigid in both the vertical direction V and the horizontal direction H; a series of partially, i.e., vertically, rigid support blocks C20 each spaced between two fully rigid blocks C10 and a series of supports C30 which are incapable of resisting a moment. The supports C30 may be conceptually thought of as strings which connect the corners of the fully rigid support blocks C10 to the corners of the particularly rigid support C20 as shown in FIG. 1.

Since bearings, whether radial, thrust or combined radial and thrust generally include a continuous, i.e., circular, support network, the sections of any bearing employing this invention would also generally be connected in a continuous fashion, i.e., the end of the last section would be connected to the beginning of the first section so as to provide a continuous support network.

FIGS. 10C and 10D illustrate the concept underlying a bearing having a continuous bearing face. Specifically, these drawings show somewhat schematically one section of a bearing constructed of a series of identical sections connected to one another in a continuous fashion. The bearing includes a continuous bearing surface 350 and a support structure which includes a series of identical sections. Each section includes a fully rigid load supporting section CIO, a vertically (partially) rigid T-shaped vertical support section C20 and connecting sections C30 between the rigid sections 10 and the T-shaped sections C20.

The connecting sections 30 have a small ability to resist moment; however, the sections are made as thin as possible to substantially reduce their moment resisting ability. As the connecting portions C30 are made thinner, their ability to resist moment is reduced and the structure operates likes the conceptual system described above and illustrated in FIGS. 10C-10D. Of course, the connecting portions 30 must be thick enough to avoid fatigue failure, or some other failure under load.

If the cross-member of the T-shaped portion significantly cantilevers, the advantages achieved by providing the cross-member, namely, increased differential and horizontal spacing between the upper left corner C20L and the upper right corner C20R per angle deflection of the vertical support C20 are negated. Accordingly, another important design consideration is that the horizontal cross-member of the T-shaped portion C20 should be relatively rigid in the vertical direction so that this portion does not significantly cantilever under load.

FIG. 10C depicts the bearing structure in an unloaded state. In this state, the continuous bearing surface is flat. FIG. 10D depicts the deflection (greatly exaggerated) of the support structure and consequent deformation of the support surface 8 when a load is applied across the bearing surface 8. In particular, as shown in FIG. 10D, the vertical support beam deflects or cantilevers such that the upper left corner C20L assumes a position substantially above the upper right corner C20R. As mentioned before, the cross-member should be relatively rigid otherwise the T-member would deflect in an umbrella type double cantilever fashion thereby lessening the degree of horizontal elevation of the left corner C20L with respect to the right corner C20R. The support structure assumes the equilibrium position shown in FIG. 10D as a consequence of the deflection of the T-shaped member C20 (which yields the high differential between the left corner C20L and the right corner C20R) and because of the extremely limited moment resisting capability of the connecting portions C30 and the almost total absence of deflection of the fully rigid members C10. In this position, the continuous bearing surface is deformed into a circumferentially spaced series of a wedge shaped surface features. If the support structure is designed so as to deflect properly, the wedge shaped features correspond to an optimal hydrodynamic wedge so that as the shaft to be supported rotates, it is supported by fluid which is pressurized by the hydrodynamic wedge between the shaft surface and the continuous bearing surface.

Figure 11A:
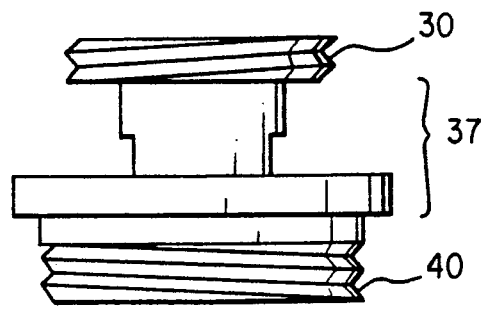
FIG. 11A is a side view of a modular bearing pad support structure.

FIG. 11A illustrates one form of modular bearing pad support portion for use in the modular bearing pad construction contemplated by the present invention. In particular, FIG. 11A illustrates the bearing pad support portion which would be used to construct a modular bearing based upon the integral bearing illustrated in FIGS. 4A-4E and 5A-5E. As illustrated in FIG. 11A, the support portion includes a threaded section 30 above the primary support portion and threaded extension 40 of the tertiary support portion. These two threaded sections 30, 40 can be received in complementary threaded bores in the bearing pad portion and carrier member, respectively. Thus, the modular construction shown in FIG. 11A is adapted to be releasably secured to the carrier and bearing pad. Of course, any known complementary connectors can be used.

Figure 11B:
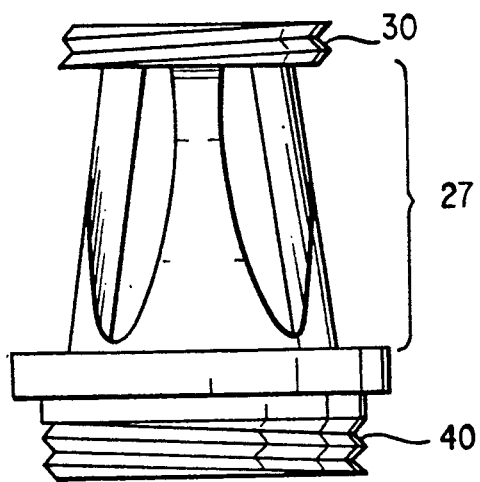
FIG. 11B is a side view of another modular bearing pad support structure.

FIG. 11B shows another form of modular bearing pad support portion having a threaded upper section 30 and a threaded extension 40 of the tertiary support member. The actual support portion 27 of this bearing is of the type which could be used to construct a bearing such as that illustrated in FIGS. 2, 3A and 3B in a modular fashion. Again, any known complementary connectors can be used.

Figure 12D:
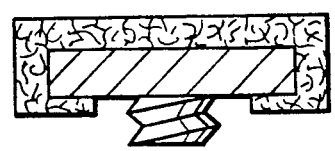
FIG. 12D is a side cross section of a modular bearing pad with a screw type connector in which the bearing pad has a different material molded onto a base made of a different material.
Figure 12E:
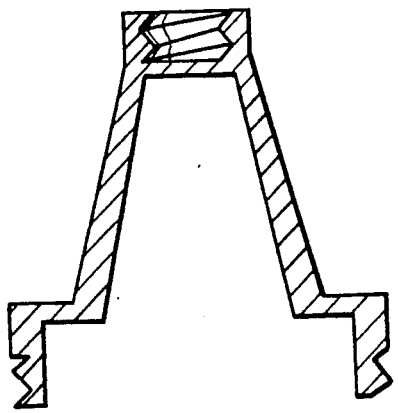
FIG. 12E is a side cross-section of a modular frusto-conical bearing pad support structure component.
Figure 12F:
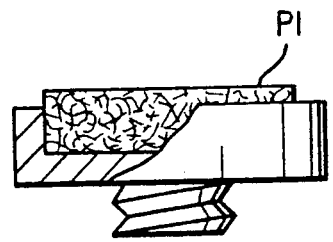
FIG. 12F is a partially cut away side view of a modular bearing pad component in which a pad insert is supported in the bearing pad.

Although the modular constructions illustrated in FIG. 11A and 11B include a relatively wide based threaded connecting construction. Other types of modular components and connections are possible. FIGS. 12A-12F illustrate several such components and connections. Specifically, FIG. 12A illustrates the upper portion of a modular support portion of the type shown in FIG. 11A in which a threaded securing post is provided rather than the wide based threaded member shown in FIG. 11A. Naturally, such a post could be provided as an alternative to the wide based threaded members illustrated in FIGS. 11A and 11B. FIGS. 12B and 12C illustrate a splined snap lock which can be used as an alternative to the threaded member illustrated in FIG. 12A. Of course, the male portion of the connector could be formed on the pad rather than the support structure. An example of such a construction is illustrated in FIGS. 12D and 12F and FIG. 12E shows a support structure with a female connecting portion formed therein. FIG. 12D further illustrates a composite pad having a structural base formed of one material (generally metal) and a cap of another type of material (generally rubber or polymer) molded thereon. FIG. 12F shows a bearing pad which includes a separate pad insert PI made of a different material than the remainder of the bearing pad. The pad insert could be made of any high performance bearing material such as, for example, silicon carbide, bronze, hardened rubber, a polymer or some actively controllably "smart material" such as a piezoelectric quartz or polymeric material.

Because the remainder of the pad does not contact the shaft portion to be supported, it can be formed of a less expensive material.

In addition to the illustrated constructions, other possible constructions include a leur lock, a cam lock, a twist lock or any known releasable securing means. Moreover, although not specifically illustrated, it is contemplated that in certain instances the modular components can be non-releasably secured to one another such by for example press fitting, gluing, welding or any other known construction.

I claim:

1. A modular hydrodynamic bearing adapted to support a rotating shaft, the bearing comprising;
a carrier member, the carrier member having a plurality of openings formed therein, the openings being spaced about a predetermined axis;
a plurality of bearing pads secured in the openings of the carrier, each of the bearing pads comprising a pad portion having a pad surface and a support portion supporting the pad portion, the pad portion being secured to one portion of the support portion and another portion of the support portion being secured in one of said plurality of bores;
and the support portion of each of the bearing pads including a continuous conical portion and being designed such that, under load, the bearing pads deflect such that they form a hydrodynamic wedge with respect to the shaft.

2. The hydrodynamic bearing of claim 1, wherein each pad portion is threadably connected to a support portion.

3. The hydrodynamic bearing of claim 1, wherein each pad portion is releasably connected to the support portion by a spline-lock connection.

4. The hydrodynamic bearing of claim 1, wherein the pad surfaces of all of the bearing pads lie substantially in a common plane when the bearing is not loaded, said plane being substantially parallel to the plane of the shaft portion to be supported.

5. The hydrodynamic bearing of claim 1, wherein the pad includes two distinct portions formed of different materials, at least one portion being formed of a different material than the support portion.

6. The hydrodynamic bearing of claim 1, wherein the pad surface is non-circular.

7. The hydrodynamic bearing of claim 1, wherein a locating projection is provided on one of the pad portion and the support portion and the other of the pad portion and the support portion includes a projection receiving opening for receiving the projection so as to precisely position the non-circular bearing pad with respect to the support portion.

8. The hydrodynamic bearing of claim 1, wherein a locating projection is provided on one of the bearing pad support portions and the carrier and the other of the pad portions and the support portion includes a projection receiving opening for receiving the projection so as to precisely position the support portion with respect to the carrier member.

9. The hydrodynamic bearing of claim 1, wherein the bearing pad support portion is threadably connected to the carrier.

10. The hydrodynamic bearing of claim 1, wherein the support portion of each bearing pad is connected to the carrier via a spline lock connection.

11. The hydrodynamic bearing of claim 1, wherein each support portion of the plurality of bearing pads includes a primary support portion, a secondary support portion and a tertiary support portion.

12. The hydrodynamic bearing of claim 1, wherein the support portion of each bearing pad includes a continuous membrane.

13. The hydrodynamic bearing of claim 12, wherein at least one opening is provided in the membrane such that the support structure is more flexible in one direction than in another direction.

14. The hydrodynamic bearing of claim 1, wherein the bearing is a journal bearing having a longitudinal axis and the openings formed in the carrier extend radially toward the axis.

15. A hydrodynamic bearing for supporting a rotating shaft part, the hydrodynamic bearing comprising:
a unitary carrier, the carrier having an axis, the carrier further comprising a plurality of openings spaced about the axis;
a plurality of bearing pads, each bearing pad being mounted in one of the openings formed in the carrier, each bearing pad comprising a pad portion and a support portion, the support portion including a continuous frustoconical section having a large base and a narrow end, the narrow end being secured to the pad portion.

16. The hydrodynamic bearing of claim 15, wherein the support portion is releasably secured to the pad portion.

17. The bearing of claim 15, wherein the support portion is releasably secured to the carrier.

18. The hydrodynamic bearing of claim 15, wherein the support portion of the bearing pads further include a membrane section connected to the base of the frustoconical section and an annular leg connected to the membrane section.

19. The hydrodynamic bearing of claim 15, wherein the pad portion includes at least two distinct sections formed of different materials.

20. The hydrodynamic bearing of claim 19, wherein one of the materials is a piezoelectric material.

21. The hydrodynamic bearing of claim 15, wherein the carrier is a flexible carrier formed with a plurality of bores so as to define recessed pad support surfaces on which the bearings pads are mounted; the carrier further comprising a support structure supporting the pad support surfaces such that the pad support surfaces are flexibly supported for deflection in a predetermined direction.

* * * * *